United States Patent
Karazoun

(10) Patent No.: US 10,777,211 B2
(45) Date of Patent: *Sep. 15, 2020

(54) METHODS AND APPARATUS TO INSPECT CHARACTERISTICS OF MULTICHANNEL AUDIO

(71) Applicant: The Nielsen Company (US), LLC, New York, NY (US)

(72) Inventor: Khaldun Karazoun, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/363,754

(22) Filed: Mar. 25, 2019

(65) Prior Publication Data

US 2019/0221221 A1    Jul. 18, 2019

Related U.S. Application Data

(63) Continuation of application No. 15/612,960, filed on Jun. 2, 2017, now Pat. No. 10,242,680.

(51) Int. Cl.
*G10L 19/018* (2013.01)
*G10L 19/008* (2013.01)
(Continued)

(52) U.S. Cl.
CPC .......... *G10L 19/018* (2013.01); *G10L 19/008* (2013.01); *G10L 19/167* (2013.01); *G10L 21/055* (2013.01); *G11B 27/10* (2013.01)

(58) Field of Classification Search
CPC ... G10L 19/018; G10L 19/008; G10L 21/055; H04L 2209/608; G06F 2221/0733;
(Continued)

(56) References Cited

U.S. PATENT DOCUMENTS 7,158,624 B1    1/2007 O'Toole
8,270,630 B2    9/2012 Johnson
(Continued)

OTHER PUBLICATIONS

Kondo et al., "A Digital Watermark for Stereo Audio Signals Using Variable Inter-channel Delay in High-Frequency Bands and its Evaluation," http://www.academia.edu/3379417/A_DIGITAL_WATERMARK_FOR_STEREO_AUDIO_SIGNALS_USING_VARIABLE_INTERCHANNEL_DELAY_IN_HIG . . . , Accessed Oct. 17, 2016, 11 pages.

(Continued)

*Primary Examiner* — Andrew C Flanders
(74) *Attorney, Agent, or Firm* — Hanley, Flight & Zimmerman, LLC

(57) ABSTRACT

Methods, apparatus, systems and articles of manufacture are disclosed for audio watermarking and, more particularly, methods and apparatus to inspect characteristics of multichannel audio. An example apparatus disclosed herein includes an audio demultiplexer to obtain a first audio subchannel and a second audio subchannel of a multichannel audio signal and a watermark detector to detect watermarks in the first audio subchannel and watermarks in the second audio subchannel. The example apparatus further includes a channel characteristic inspector to compare a number of watermarks detected in the first audio subchannel and a number of watermarks detected in the second audio subchannel to determine whether the first and second audio subchannels were watermarked in accordance with a watermark encoder configuration and a result alerter to distribute an alert in response to a determination that the first and second audio subchannels were not watermarked in accordance with the watermark encoder configuration.

11 Claims, 10 Drawing Sheets

(51) Int. Cl.
*G10L 19/16* (2013.01)
*G10L 21/055* (2013.01)
*G11B 27/10* (2006.01)

(58) Field of Classification Search
CPC .............. G06T 1/0071; H04N 1/3232; H04N 1/32325; H04N 1/32331; H04N 21/8358
See application file for complete search history.

(56) References Cited

U.S. PATENT DOCUMENTS

| | | | |
|---|---|---|---|
| 8,320,824 B2 | 11/2012 | Banks et al. | |
| 8,589,969 B2 | 11/2013 | Falcon | |
| 9,093,064 B2 | 7/2015 | Srinivasan et al. | |
| 9,305,559 B2 | 4/2016 | Sharma et al. | |
| 9,426,598 B2 | 8/2016 | Walsh et al. | |
| 10,242,680 B2 * | 3/2019 | Karazoun | G10L 19/018 |
| 2002/0095577 A1 * | 7/2002 | Nakamura | G06T 1/0071 |
| | | | 713/176 |
| 2003/0012403 A1 | 1/2003 | Rhoads et al. | |
| 2003/0033325 A1 | 2/2003 | Boogaard | |
| 2004/0161108 A1 | 8/2004 | Ando et al. | |
| 2006/0239503 A1 | 10/2006 | Petrovic et al. | |
| 2008/0098022 A1 | 4/2008 | Vestergaard | |
| 2010/0205628 A1 | 8/2010 | Davis et al. | |
| 2011/0022206 A1 | 1/2011 | Scharrer et al. | |
| 2012/0072731 A1 | 3/2012 | Winograd et al. | |
| 2012/0277893 A1 | 11/2012 | Davis et al. | |
| 2014/0079242 A1 | 3/2014 | Nguyen et al. | |
| 2014/0119561 A1 | 5/2014 | Banks et al. | |
| 2015/0317988 A1 | 11/2015 | Srinivasan et al. | |
| 2016/0210972 A1 | 7/2016 | Nurmukhanov et al. | |
| 2016/0259775 A1 | 9/2016 | Gelfenbeyn et al. | |
| 2017/0019748 A1 | 1/2017 | Cheon et al. | |
| 2017/0150286 A1 | 5/2017 | Sporer et al. | |

OTHER PUBLICATIONS

Kondo et al., "A Digital Watermark for Stereo Audio Signals Using Variable Interchannel Delay in High Frequency Bands," Intelligent Information Hiding and Multimedia Signal Processing, IIHMSP'08 International Conference, IEEE, 2008, 4 pages.

Perrin, "'Speaker Check for Apple TV' Puts Your Surround Sound to the Test (Literally!)", http://www.jeffperrinmusic.com/blog/speakercheckforappletvreleased/, Apr. 17, 2015, 3 pages.

Pomerantz, "Using test tones to set amplifier gain," http://www.crutchfield.com/SwjeoE2fbozb/learn/settingamplifiergain.html, Car Amplifier Articles, Oct. 26, 2016, 8 pages.

Turbofuture, "How to Set up & Calibrate 5.1/6.1/7.1 Surround Sound Speaker System," https://turbofuture.com/hometheateraudio/Howtosetupandcalibrateyourhomecinemaortheatersurroundsoundsystem, TurboFuture Home Theater & Audio, Jun. 27, 2015, 13 pages.

"Non Final Office Action", issued by the United States Patent and Trademark Office dated Jun. 21, 2018, in connection with U.S. Appl. No. 15/612,960 (9 pages).

"Notice of Allowance", issued by the United States Patent and Trademark Office dated Nov. 13, 2018, in connection with U.S. Appl. No. 15/612,960 (5 pages).

* cited by examiner

| MEDIA PROVIDER | CHANNEL MAPPING RESULT | CHANNEL TIMING RESULT |
|---|---|---|
| CBS 2 WBBM | AUDIO IS OK | CHANNEL 2 DELAY |
| NBC 5 WMAQ | CHANNEL MAPPING ISSUE | AUDIO IS OK |
| ABC 7 WLS | AUDIO IS OK | AUDIO IS OK |
| FOX 32 WFLD | AUDIO IS OK | CHANNEL N DELAY |
| MY 50 WPWR | LEFT CHANNEL MAPPING ISSUE | AUDIO IS OK |
| WGN 9 | AUDIO IS OK | NOT INSPECTED |
| PBS 11 WTTW | NOT INSPECTED | AUDIO IS OK |

METHODS AND APPARATUS TO INSPECT CHARACTERISTICS OF MULTICHANNEL AUDIO

RELATED APPLICATION(S)

This patent arises from a continuation of U.S. patent application Ser. No. 15/612,960, which was filed on Jun. 2, 2017, and is entitled "METHODS AND APPARATUS TO INSPECT CHARACTERISTICS OF MULTICHANNEL AUDIO." Priority to U.S. patent application Ser. No. 15/612,960 is claimed. U.S. patent application Ser. No. 15/612,960 is hereby incorporated herein by reference in its entirety.

FIELD OF THE DISCLOSURE

This disclosure relates generally to audio watermarking and, more particularly, methods and apparatus to inspect characteristics of multichannel audio.

BACKGROUND

Audio watermarks are embedded into audio signals to carry hidden data that can be used in a wide variety of practical applications. For example, to monitor the distribution of media content and/or advertisements, such as television broadcasts, radio broadcasts, streamed multimedia content, etc., audio watermarks carrying media identification information can be embedded in the audio portion(s) of the distributed media. During a media presentation, the audio watermark(s) embedded in the audio portion(s) of the media can be detected by a watermark detector and decoded to obtain the media identification information identifying the presented media.

In some examples, the audio source provided to a media device is a multichannel audio signal. In such examples, watermarks are embedded in specific subchannels of the multichannel audio signal by the media provider. However, a media provider embedding watermarks into improper audio subchannels or improperly synchronizing the timing of the embedded watermarks across audio subchannels can lead to one or more undesirable results, including the watermarks no longer being detectable by detection hardware or the watermarks becoming perceptible to the end user. With the current state of the technology, issues with audio channel mapping and timing can go undetected and therefor unaddressed for extended periods of time, which can have an adverse effect on the ratings of programs with improperly embedded audio watermarks.

BRIEF DESCRIPTION OF THE DRAWINGS

FIG. 4 is an example table showing results determined and output by the channel characteristic inspector of FIG. 3.

DETAILED DESCRIPTION

Figure 1:
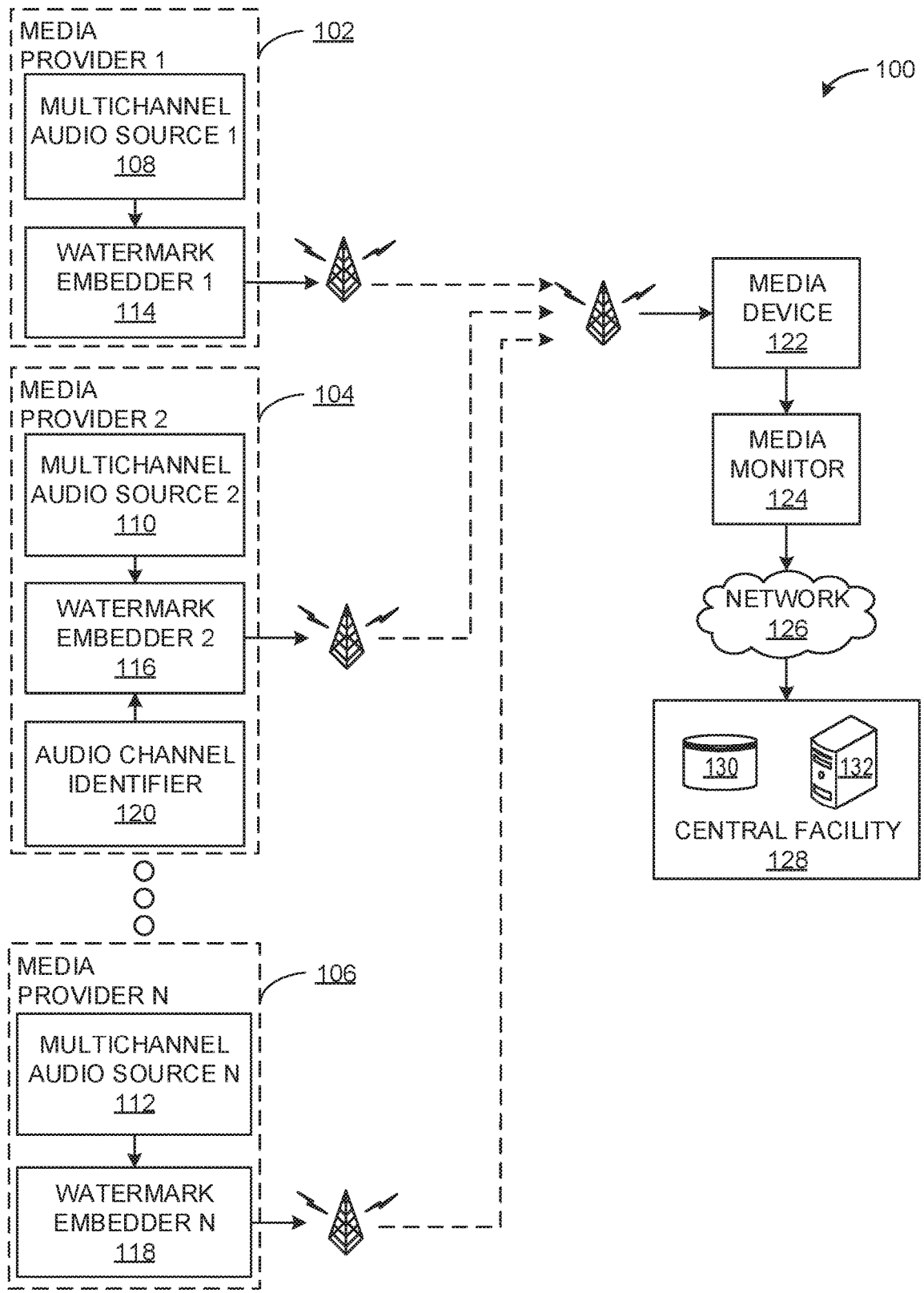
FIG. 1 is a block diagram of an example environment in which a system for inspecting channel characteristics of a multichannel audio signal constructed with the teachings of this disclosure operates.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header) or characteristic inspection. As used herein, the terms "encode" or "embed" are used interchangeably and are defined to mean any method of inserting a code or watermark into the audio or video portion of a media presentation (e.g., a program or advertisement). As used herein "media" refers to audio and/or visual (still or moving) content and/or advertisements. To identify watermarked media, the watermark(s) are extracted and used to access reference watermarks that are mapped to media identifying information.

The aforementioned embedding of watermarked identification information in media is often performed at or on the behalf of a media provider. Such embedding relies on cooperation with media providers, and also, in some examples, relies upon media providers properly embedding watermarks into one or more subchannels of a multichannel audio signal. As used herein, "subchannel" and "channel" are used interchangeably and are defined to mean any individual audio signal to be distributed to an individual audio output source of a multichannel audio signal. Several examples of common multichannel audio signals include 2-channel stereo, 3-channel stereo, and 5.1 channel surround sound. The channels of a 2-channel stereo are referred to as Left (L) and Right (R), 3-channel stereo adds a Center channel (C), and 5.1 channel surround sound further adds Left Surround (LS), Right Surround (RS), and Low Frequency (LFE) channels. As used herein, "multichannel audio signal" and "multichannel audio" are used interchangeably and are defined to mean audio signal containing two or more audio subchannels.

The embedding of watermarks is further reliant upon the media provider properly configuring the mapping (i.e., which subchannels of a multichannel audio signal receive embedded watermarks and which subchannels do not) of the watermark encoders. When properly encoded, audio watermarks will be distributed substantially equally between the Left, Right, and Center audio channels. Conversely, an insignificant quantity of watermarks will be distributed in the Left Surround, Right Surround, and Low Frequency audio channels. However, there are many example improper channel mappings that could be configured by the media provider. For example, in mapping 6 channels (e.g., 5.1 surround sound), the encoder mapping could be configured as 3 pairs of 2-channel stereo or 2 pairs of 3-channel stereo. In the aforementioned cases, watermarks would appear on all 6 subchannels of the multichannel audio signal. Alternatively, the example encoder could map 2 pairs of LS, RS, and LFE audio channels to a 6 channel audio signal. In this case, watermarks would not appear in any subchannels of the example multichannel audio signal. All cases above will directly impact the detectability of one or more watermark(s) by audio watermarking detection devices and are meant as examples, not limiting the number of improper audio channel mappings that could exist.

The embedding of watermarks further relies upon media providers embedding watermarks at the proper instants in time. In order to ensure proper decoding of watermarks when embedding one or more watermark(s) into two or more subchannels of a multichannel audio signal, subchannels containing watermarks must be synchronized in time (i.e., contain synchronized timestamps). When one or more watermark(s) in two or more subchannels are properly synchronized in time, the timing of the one or more watermark(s) will not negatively impact the decoding of the more or more watermark(s). Alternately, when one or more watermark(s) in two or more subchannels are not properly synchronized in time, a potential for one or more watermark(s) embedded on two or more subchannels of a multichannel audio signal to interfere with one another exists. Additionally, as used herein, a "channel pair" refers to any two subchannels of a multichannel audio signal. In this alternative example, the possibility exists that the described interference will cause one or more watermark(s) to be undetectable by an example watermark detector and/or become audible to an example audience of the presented media.

Example methods, apparatus, and articles of manufacture disclosed herein inspect characteristics of multichannel audio signals presented at media devices. Such media devices may include, for example, set-top boxes (STB), cable and/or satellite receivers, Internet-enabled televisions, personal computers, Internet-enabled mobile handsets (e.g., a smartphone), video game consoles (e.g., Xbox®, PlayStation®), tablet computers (e.g., an iPad®), digital media players (e.g., a Roku® media player, a Slingbox®, etc.), etc. In some examples, inspection information is aggregated to determine the presence of proper and/or improper characteristics, in some such examples including at least one of a channel mapping characteristic and a channel timing characteristic, of watermarks embedded in multichannel audio signals. In other such examples, the presence of improper characteristics of watermarks embedded in multichannel audio signals is distributed as an alert. In examples disclosed herein, monitoring information includes, but is not limited to, media identifying information (e.g., media-identifying metadata, codes, signatures, watermarks, and/or other information that may be used to identify presented media), audio subchannel identification information (e.g., audio subchannel identifying watermarks, codes, signatures, etc.), application usage information (e.g., an identifier of an application, a time and/or duration of use of the application, a rating of the application, etc.), and/or user-identifying information (e.g., demographic information, a user identifier, a panelist identifier, a username, etc.).

Some example methods further include using watermarks designated for media monitoring and/or crediting to inspect the channel mapping of watermarks embedded in one or more subchannel(s) of a multichannel audio signal and/or the channel timing of watermarks embedded in two or more subchannels of a multichannel audio signal. In some such example methods, to inspect the channel mapping of a multichannel audio signal, the quantity of embedded watermarks detected in each subchannel are compared. For example, for 5.1 channel surround sound, if the quantity of embedded watermarks detected in one or more of the LFE, LS, and/or RS audio channel(s) is significant when compared to the quantity of embedded watermarks detected in the C channel, indicating that the channel mapping is improper. Alternatively, if the quantity of embedded watermarks detected in the LFE, LS, and RS audio channels is insignificant when compared to the quantity of embedded watermarks detected in the C channel, indicating that the channel mapping is correct. In some such examples, "insignificant" can be further defined to mean less than 1% and "significant" can be further defined to mean greater than 1%.

Additionally or alternatively, if the number of embedded watermarks detected in the C channel is not approximately equal to the L, and R channels, indicating that a possible audio channel mapping issue exists. Alternatively, if the number of embedded watermarks detected in the C channel is approximately equal to the L, and R audio channels, indicating that the channel mapping may be correct. Additionally or alternatively, any combination or permutation of the above examples may be employed to inspect the channel mapping of a multichannel audio signal. Additionally, the above disclosed examples are not meant to be limiting to the scope of the coverage of this patent. On the contrary, this patent covers all examples of using embedded watermarks to inspect channel mapping of a multichannel audio signal. In some such examples, "approximately" can be further defined to mean within a tolerance of 50% to 90% inclusive.

Some example methods further include inspecting the channel mapping of a multichannel audio signal when audio channel identifier watermarks are available. In such examples, with cooperation from media providers, additional watermarking information can be embedded into one or more subchannel(s) of a multichannel audio signal. Further, the additional watermarking information embedded would be the intended audio subchannel for the watermark to be embedded in. For example, if a L audio channel watermark identifier is detected on the L audio channel, a R audio channel watermark identifier is detected on the R audio channel, and so on for each subchannel of a multichannel audio signal, indicating that the channel mapping is correct. Alternatively, if one or more of the audio channel identifier watermark(s) is(are) not detected on the proper subchannel(s) (i.e., a C audio channel watermark identifier is detected on the R audio channel or the LS audio channel watermark identifier is detected on the R audio channel, etc.), indicating that the channel mapping is improper.

Additionally or alternatively, example methods further include detecting the timing of one or more embedded watermark(s) embedded in two or more audio subchannels of a multichannel audio signal. In such examples, timestamp(s) from one or more embedded watermark(s), intended to be embedded at a similar time, in two or more audio subchannels of a multichannel audio signal are extracted. Once extracted, the timestamp(s) of one or more embedded watermark(s) from two or more subchannels of a multichannel audio signal are compared. In some examples, if a time discrepancy exists for any one or more watermark(s) intended to be embedded at a similar time from two or more audio subchannels of a multichannel audio signal, indicating that an audio subchannel timing issue exists. Alternatively, if all of one or more watermark(s) intended to be embedded at a similar time from two or more audio subchannels of a multichannel audio signal contain similar timestamps, indicating that the channel timing of the inspected audio subchannels is correct. In some such examples, "similar" can be further defined to mean within a tolerance of 0.0833 milliseconds.

Additionally or alternatively, combinations of the foregoing channel characteristic inspection examples for multichannel audio signals are also possible, as described in further detail below.

Turning to the figures, a block diagram of example system 100 for distributing audio/media and inspecting characteristics of multichannel audio signals includes media providers 102, 104, and 106. The media providers 102, 104, and 106 further include multichannel audio sources 108, 110, and 112, and watermark embedders 114, 116, and 118. Alternatively, the example media provider 104 also includes an audio channel identifier 120 embedded by watermark embedder 116. The example system 100 further includes a media device 122, a media monitor 124, a network 126, and a central facility 128. The central facility, for example, includes a data store 130, and a processor 132.

The example media provider(s) 102, 104, and/or 106 of the illustrated example of FIG. 1 correspond(s) to any one or more media provider(s) capable of providing media for presentation via the media device 122. The media distributed by the media provider(s) 102,104, and/or 106 can provide any type(s) of media containing a multichannel audio signal. Additionally, the media can correspond to live media, streaming media, broadcast media, stored media, on-demand content, etc.

The example multichannel audio source(s) 108, 110, and/or 112 of the illustrated example of FIG. 1 correspond(s) to any audio source containing two or more audio subchannels that may be presented using two or more example speakers. Each of the audio subchannels, prior to any signal processing, is combined in one signal. Examples of multichannel audio sources include 2-channel stereo (L and R channels), 2.1 channel stereo (L and R and LFE channels), 3-channel stereo (L, R, and C channels), and 5.1 channel surround (L, R, C, LS, RS, and LFE channels). Note that the above examples are not meant to be limiting, and that any audio signal containing two or more subchannels can be classified as a multichannel audio signal.

The example watermarks embedder(s) 114, 116, and/or 118 of the illustrated example of FIG. 1 embed one or more media identifying watermark(s) into one or more subchannel(s) of the multichannel audio source(s) 108, 110, and/or 112 distributed from the media provider(s) 102, 104, and/or 106. In one example of proper audio subchannel watermark embedding, the example watermark embedder(s) 114, 116, and/or 118 will embed a similar quantity of watermarks, synchronized in time, to the example L, R, and C channels, and will embed an insignificant quantity of watermarks in the example LS, RS, and LFE channels of an example 5.1 surround sound mapping of the example multichannel audio source(s) 108, 110, and/or 112.

Additionally or alternatively, in an example of improper audio subchannel watermark embedding, the example watermark embedder(s) 114, 116, and/or 118 will embed a dissimilar amount of watermarks, which may be out of synchronization in time, in the example L, R, and C audio channels and/or will embed a substantially significant quantity of watermarks in the example LS, RS, and/or LFE channels of an example 5.1 surround sound mapping of the example multichannel audio source(s) 108, 110, and/or 112. Note that the above examples are not meant to be limiting, and that any combination and/or permutation of the foregoing audio channel watermark characteristics are covered in the scope of this patent.

The example audio channel identifier 120 of the illustrated example of FIG. 1 embeds one or more additional watermark(s) into one or more subchannel(s) of the multichannel audio source 110 from the media provider 104. In such an example, the additional watermark(s) contain(s) information identifying the proper audio subchannel for one or more embedded watermark(s) in one or more audio subchannel(s) of the multichannel audio source 110. Thus, the one or more additional watermark(s) embedded into one or more subchannel(s) of the multichannel audio source 110 from media provider 104 may be used to, in one such example, determine that one or more content identifying watermark(s) embedded into one or more audio subchannel(s) are each embedded into the proper one or more audio channel(s).

Additionally or alternatively, the one or more additional watermark(s) embedded into one or more subchannel(s) of the multichannel audio source 110 from media provider 104 may be used, in another such example, to determine that one or more content identifying watermark(s) embedded into one or more audio subchannel(s) are embedded in the improper (i.e., the Left channel audio watermark of the multichannel audio source 110 is embedded in a Right audio channel of the multichannel audio source 110) one or more audio subchannel(s).

The example media device 122 of the illustrated example shown in FIG. 1 is a device that receives media from the example media provider(s) 102, 104, and/or 106 for presentation. In some examples, the media device 122 is capable of directly presenting media (e.g., via a display) while, in other examples, the media device 122 presents the media on separate media presentation equipment (e.g., speakers, a display, etc.). Thus, as used herein "media devices" may or may not be able to present media without assistance from a second device. Media devices are typically consumer electronics. For example, if the media device 122 is a personal computer such as a laptop computer, and thus, is capable of directly presenting media (e.g., via an integrated and/or connected display and speakers). While in the above example a personal computer is described, any other type(s) and/or number(s) of media device(s) may additionally or alternatively be used. For example, set-top boxes (STB), cable and/or satellite receivers, Internet-enabled mobile handsets (e.g., a smartphone, an iPod®, etc.), video game consoles (e.g., Xbox®, PlayStation® 4, etc.), tablet computers (e.g., an iPad®, a Motorola™ Xoom™, etc.), digital media players (e.g., a Roku® media player, a Slingbox®, a Tivo®, etc.), smart televisions, desktop computers, laptop computers, servers, etc. may additionally or alternatively be used.

The example media monitor 124 of the illustrated example shown in FIG. 1, described in greater detail below, inspects one or more characteristic(s) of the example multichannel audio source(s) 108, 110, and/or 112 containing watermarks embedded by the example watermark embedder(s) 114, 116, and/or 118 and distributed by the example media provider(s) 102, 104, and/or 106. For example, the media monitor 124 can inspect a channel timing for one or more pair(s) of audio subchannels of the example multichannel audio source(s) 108, 110, and/or 112, and inspect a channel mapping of the example multichannel audio source(s) 108, 110, and/or 112 using audio watermarks embedded for the purpose of content identification and/or crediting by the example watermark embedder(s) 114, 116, and/or 118.

Additionally or alternatively, the media monitor 124 can inspect a channel timing for one or more pair(s) of subchannels of the multichannel audio source 110, and inspect a channel mapping of the multichannel audio source 110 using one or more audio watermark(s) containing audio channel identifier 120 embedded by the watermark embedder 116.

Additionally or alternatively, the media monitor 124 can inspect fewer than two channel characteristics of the example multichannel audio source(s) 108, 110, and/or 112. In some such examples, the media monitor 124 can inspect channel timing, but not channel mapping. Additionally or alternatively, the media monitor 124 can inspect channel mapping, but not channel timing. Additionally or alternatively, the media monitor 124 can inspect neither of channel timing and channel mapping.

The example network 126 of the illustrated example of FIG. 1 is the Internet. However, the example network 126 may be implemented using any suitable wired and/or wireless network(s) including, for example, one or more data buses, one or more Local Area Networks (LANs), one or more wireless LANs, one or more cellular networks, one or more private networks, one or more public networks, etc. The example network 126 enables the example media monitor 124 to be in communication with the example central facility 128. As used herein, the phrase "in communication," including variances thereof, encompasses direct communication and/or indirect communication through one or more intermediary components and does not require direct physical (e.g., wired) communication and/or constant communication, but rather includes selective communication at periodic or aperiodic intervals, as well as one-time events.

The example central facility 128 of the illustrated example of FIG. 1 is a server that collects and processes one or more inspected characteristic(s) of multichannel audio signals from the media monitor 124 to create one or more report(s), described in further detail below, on the inspected characteristics for one or more of the example multichannel audio source(s) 108, 110, and/or 112. Further, in some examples, the central facility 128 can analyze the inspection results of characteristics of multichannel audio signals of the example multichannel audio source(s) 108, 110, and/or 112. For example, a report on media provider 102 could state that both the audio channel mapping and the audio channel timing are correct.

Alternatively, a report on media provider 102 could state that an audio channel mapping issue exists, but the audio channel timing is correct. Alternatively, a report on media provider 102 could state that the audio channel mapping is correct, but a time discrepancy exists between two or more audio subchannels of the multichannel audio signal. Alternatively, a report on media provider 102 could state that an audio channel mapping issue exists and a time discrepancy exists between two or more subchannels of the multichannel audio signal.

In the illustrated example of FIG. 1, the central facility 128 includes the data store 130 to record data (e.g., obtained information, generated messages, generated reports, etc.). The data store 130 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data store 130 may additionally or alternatively be implemented by one or more double data rate (DDR) memories, such as DDR, DDR2, DDR3, DDR4, mobile DDR (mDDR), etc. The data store 130 may additionally or alternatively be implemented by one or more mass storage devices such as hard disk drive(s), compact disk drive(s) digital versatile disk drive(s), etc. While in the illustrated example the data store 130 is illustrated as a single database, the data store 130 may be implemented by any number and/or type(s) of databases. Further, the data stored in the data store 130 may be in any data format such as, for example, binary data, comma delimited data, tab delimited data, structured query language (SQL) structures, etc.

Further, the central facility 128 illustrated in FIG. 1 contains a processor 132 to process data (e.g., obtained information, generated messages, audio channel characteristics, etc.) acquired by the example media monitor 124, and to generate one or more report(s) corresponding to the one or more channel characteristic(s) inspected by the example media monitor 124.

In operation, the block diagram of example system 100 inspects channel characteristics of multichannel audio distributed by media provider(s) 102, 104, and/or 106. The media provider(s) 102, 104, and/or 106 distribute the multichannel audio source(s) 108, 110, and/or 112 containing one or more watermark(s) embedded by the watermark embedder(s) 114, 116, and/or 118. Alternatively, one or more audio channel identifier watermark(s) 120 can be embedded in the example multichannel audio source 110 by the watermark embedder 116. One or more of the multichannel audio source(s) 108, 110, and/or 112 are further received by the media device 122. The multichannel audio signal, as received by the media device 122, is distributed to the example media monitor 124. An output of the media monitor 124 is further distributed to the central facility 128 via the network 126. The central facility contains the data store 130 to store one or more output(s) from the media monitor 124, and processor 132 to process one or more output(s) from the media monitor 124.

Figure 2:
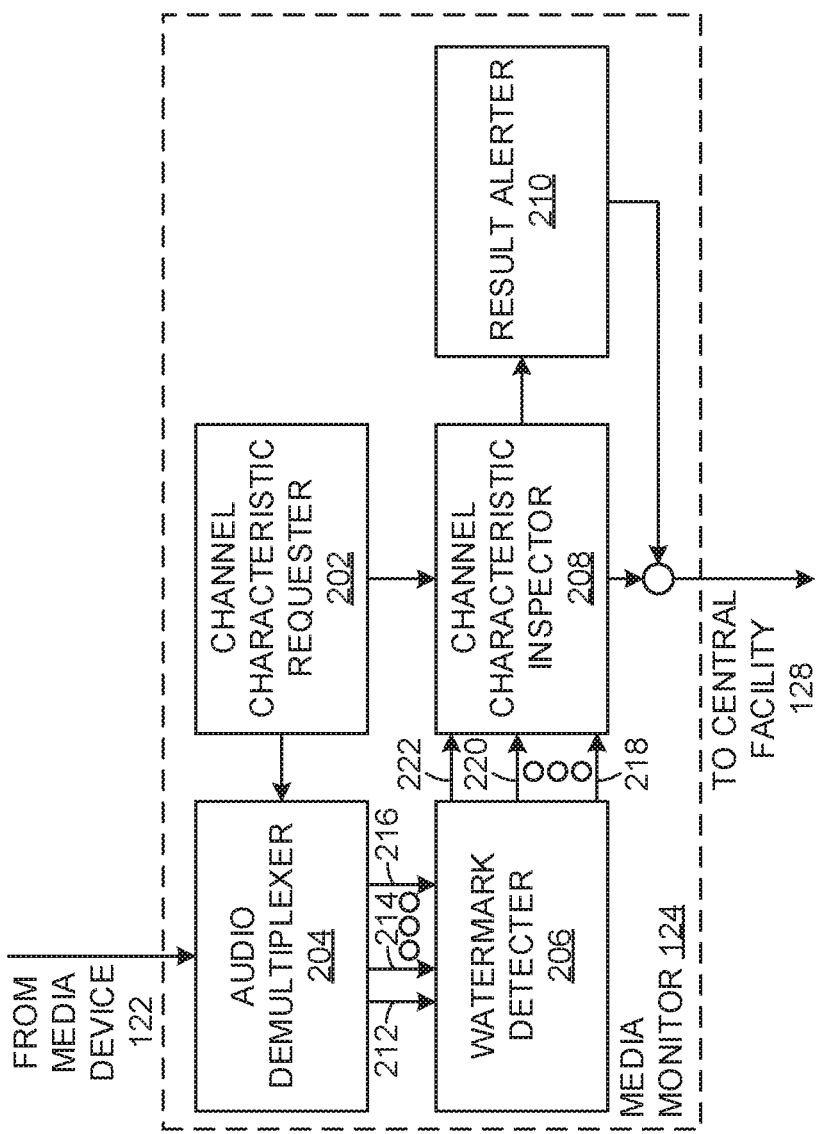
FIG. 2 is a block diagram of an example implementation of the media monitor of FIG. 1.

A block diagram further detailing the media monitor 124 of FIG. 1 is illustrated in FIG. 2. The example media monitor 124 of FIG. 2 can inspect at least one of a channel timing for one or more pair(s) of audio subchannels of the example multichannel audio source(s) 108, 110, and/or 112, and inspect the channel mapping of the example multichannel audio source(s) 108, 110, and/or 112 using audio watermarks embedded for the purpose of content identification and/or crediting by the example watermark embedder(s) 114, 116, and/or 118. Additionally or alternatively, the media monitor 124 can inspect the channel mapping of the example multichannel audio source 110 using one or more watermark(s) embedded by the example watermark embedder 116 which contain audio channel identifier 120.

Looking to FIG. 2, the illustrated example media monitor 124 of FIG. 2 includes a channel characteristic requester 202, an audio demultiplexer 204, a watermark detector 206, a channel characteristic inspector 208, a result alerter 210, audio subchannels 212, 214, and 216, and audio subchannel watermarks 218, 220, and 222.

The example channel characteristic requester 202 of the illustrated example of FIG. 2 is a device that requests one or more characteristic(s) of one or more multichannel audio source(s) 108, 110, and/or 112 to be inspected. Characteristics requested can include at least one of audio channel mapping and audio channel timing. In some examples, the example channel characteristic requester 202 will request both audio channel mapping and audio channel timing. Additionally or alternatively, the example channel characteristic requester 202 will request one of audio channel mapping or audio channel timing. Additionally or alternatively, the channel characteristic requester 202 will request neither of audio channel mapping and audio channel timing. Further, in other such examples, the channel characteristic requester 202 determines one or more media broadcast(s) of interest to be inspected.

Further, in some examples, the characteristics and broadcasts requested by the channel characteristic requester 202 can be determined by a human being (e.g., an operator, a technician, an employee of a media ratings entity, etc.). Additionally or alternatively, the characteristics and broadcasts requested by the channel characteristic requester 202 can be determined by a continuously updating computer architecture. Additionally or alternatively, the characteristics and broadcasts requested by the channel characteristic requester 202 can be constant, determined by at least one of a human being and computer architecture prior to implementation of the media monitor 124.

The example audio demultiplexer 204 of the illustrated example of FIG. 2 can receive one or more multichannel audio source(s) 108, 110, and/or 112 as presented by the example media device 122, and further obtains one or more audio subchannel(s) of the one or more multichannel audio source(s) 108, 110, and/or 112. As used herein "demultiplex", "demultiplexer", "demultiplexing", "demultiplexers", or any other form of the term "demultiplex" used in this document is defined as the act of/a device capable of electronically obtaining one or more audio subchannel(s) of a multichannel audio signal. Further, "splitting a multichannel audio signal into one or more audio subchannels", as used herein, is defined as the same as "obtaining one or more audio subchannel(s) of a multichannel audio signal."

The example watermark detector 206 of the illustrated example of FIG. 2 detects audio watermarks that were embedded or otherwise encoded by one or more of the watermark embedder(s) 114, 116, and/or 118 in the media presented by the media device 122. For example, the watermark detector 206 may access the audio presented by the media device 122 through physical (e.g., electrical) connections with the speakers of the media device 122, and/or with an audio line output (if available) of the media device 122. The audio can additionally or alternatively be captured using a microphone placed in the vicinity of the media device 122. In some examples, the watermark detector 206 can further decode watermarks and determine the payload data conveyed by the detected watermarks. Further, the decoded watermarks can, in some examples, be distributed for reporting to at least one of the media monitor 124 and the central facility 128.

The example channel characteristic inspector 208 of the illustrated example of FIG. 2, described in greater detail below, inspects one or more characteristic(s) of the example multichannel audio source(s) 108, 110, and/or 112 containing watermarks embedded by the example watermark embedder(s) 114, 116, and/or 118, wherein the multichannel audio source(s) 108, 110, and/or 112 inspected is(are) demultiplexed into one or more audio subchannel(s) 212, 214, and/or 216, from which the watermark detector 206 detects one or more audio subchannel watermark(s) 218, 220, and/or 222. Further, the one or more channel characteristic(s) inspected is(are) determined by the channel characteristic requester 202.

The example result alerter 210 of the illustrated example of FIG. 2 is a device that can output an alert regarding a result of the inspection completed by the channel characteristic inspector 208 for viewing by a human being and/or a computer architecture. In some such examples, the example result alerter 210 can be implemented by an alert transmitter (e.g., an alert transmitted via electronic mail (E-Mail), an alert transmitted as a physical letter, an alert transmitted as a text message, an alert transmitted as an instant message (IM), and/or an alert transmitted via Bluetooth, etc.). Further, in some such examples, the example result alerter 210 can distribute an alert to the central facility 128.

Additionally or alternatively, the example result alerter 210 can be implemented, for example, by one or more display device(s) (e.g., a light emitting diode (LED), an organic light emitting diode (OLED), a liquid crystal display, a cathode ray tube display (CRT), a touchscreen, a tactile output device, a printer and/or speakers).

The example audio subchannel(s) 212, 214, and/or 216 of the illustrated example of FIG. 2 is(are) audio subchannel(s) which is(are) obtained by the audio demultiplexer 204. Examples of audio subchannel(s) 212, 214, and/or 216 from multichannel audio source(s) 108, 110, and/or 112 include Left and Right channel (2-channel stereo), Left, Right, and Low Frequency channel (2.1-channel stereo), Left, Right, and Center channel (3-channel stereo), and Left, Right, Center, Left Surround, Right Surround, and Low Frequency channel (5.1 channel surround sound). Note that the above examples are not meant to be limiting, and that any two or more audio subchannels of a multichannel audio source are covered within the scope of this patent.

The example audio subchannel watermark(s) 218, 220, and/or 222 of the illustrated example of FIG. 2 is(are) one or more audio watermark(s) embedded in one or more subchannels of a multichannel audio signal acquired over a known sampling period. In some such examples, the audio subchannel watermark(s) 218, 220, and/or 222 are only detected. In such examples, only a count of one or more watermark(s) in one or more subchannel(s) of a multichannel audio signal is distributed to the channel characteristic inspector 208. Additionally or alternatively, payload information of the audio subchannel watermark(s) 218, 220, and/or 222 can be decoded. In such an example, one or more content identifying characteristic(s) (e.g., content information, audio channel identification information, timestamps, etc.) is(are) available to the channel characteristic inspector 208.

In operation, the media monitor 124 inspects at least one of a channel mapping of a multichannel audio signal and a channel timing of a multichannel audio signal by receiving one or more multichannel audio source(s) 108, 110, and/or 112 containing audio watermarks embedded by the example watermark embedder(s) 114, 116, and/or 118 with the audio demultiplexer 204. Further, the audio demultiplexer 204 can receive a request for one or more channel characteristic(s) from the channel characteristic requester 202 and one or more audio subchannel(s) 212, 214 and/or 216 can be obtained by the audio demultiplexer 204. The audio subchannel(s) 212, 214, and/or 216 are distributed to a watermark detector 206 that can at least one of detect and decode audio subchannel watermark(s) 218, 220, and/or 222 on audio subchannel(s) 212, 214, and/or 216. The audio subchannel watermark(s) 218, 220, and/or 222, at least one of detected and decoded over the known sampling period, are distributed to the channel characteristic inspector 208. The channel characteristic inspector 208 can then further inspect a subset of characteristics of a multichannel audio signal using one or more audio subchannel watermark(s) 218, 220, and/or 222 in response to a subset of channel characteristic requests from the channel characteristic requester 202. The output of the channel characteristic inspector 208 is distributed to at least one of the result alerter 210 and the central facility 128. In some such examples, the result alerter 210 further distributes a generated alert to the central facility 128.

Although the example media monitor 124 of FIG. 2 includes one channel characteristic requester 202, one audio demultiplexer 204, one watermark detector 206, one channel characteristic inspector 208, one result alerter 210, three audio subchannels 212, 214, and 216, and three audio subchannel watermarks 218, 220, and 222, the media monitor 124 as disclosed herein can be used with any number(s) of channel characteristic requesters 202, audio demultiplexers 204, watermark detectors 206, channel characteristic inspectors 208, result alerters 210, audio subchannels 212, 214, and/or 216, and audio subchannel watermarks 218, 220, and/or 222. Further, although the channel characteristic requester 202, the audio demultiplexer 204, the watermark detector 206, the channel characteristic inspector 208, and result alerter 210 are shown as being implemented within the media monitor 124, any one or more of these elements can be implemented or otherwise included in the central facility 128.

Figure 3:
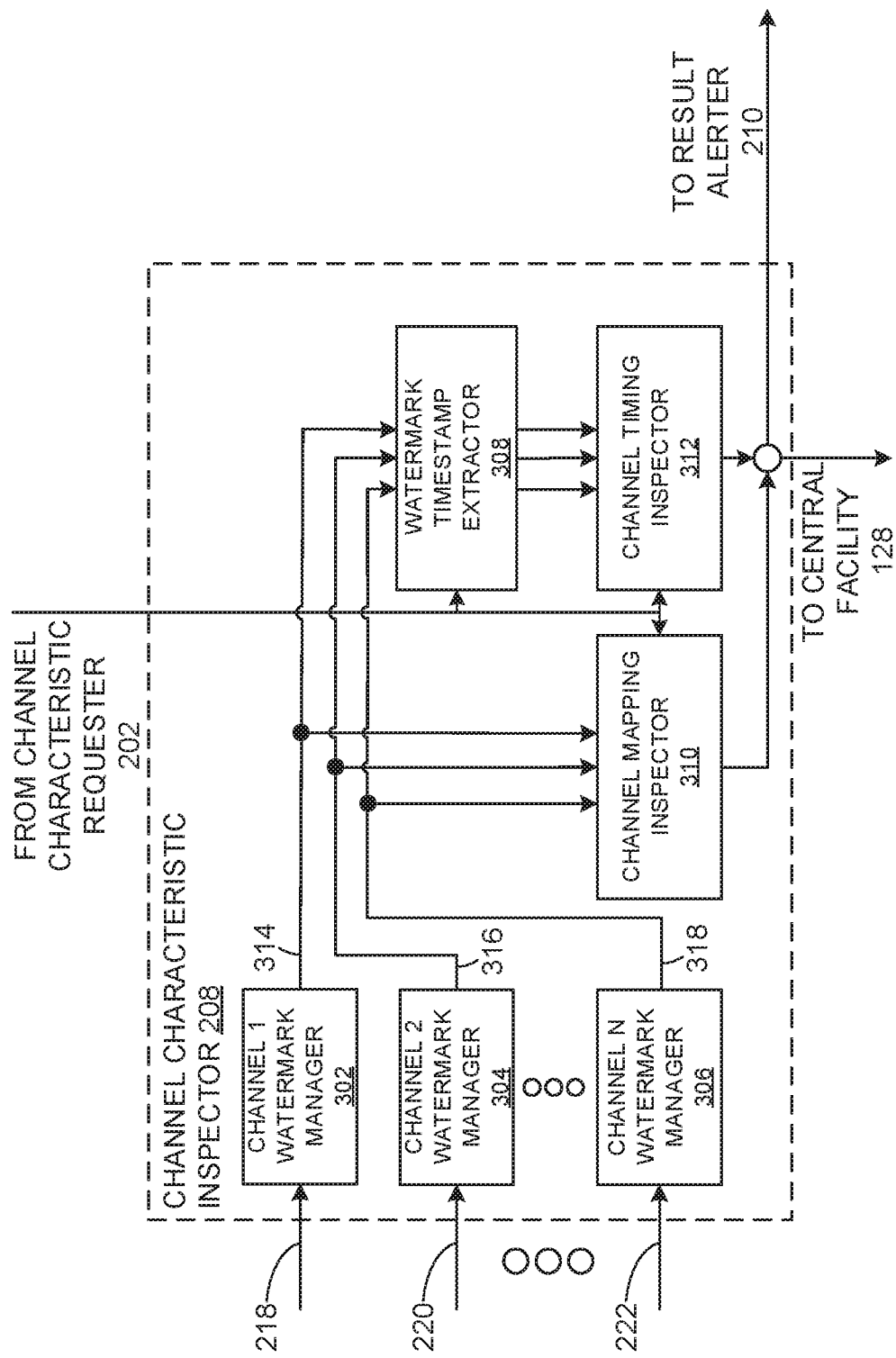
FIG. 3 is a block diagram of an example implementation of the channel characteristic inspector of the media monitor system of FIG. 2.

A block diagram further detailing the channel characteristic inspector 208 of FIG. 2 is illustrated in FIG. 3. The channel characteristic inspector 208 can inspect a channel timing for one or more pair(s) of audio subchannels of the example multichannel audio source(s) 108, 110, and/or 112, and inspect a channel mapping of the example multichannel audio source(s) 108, 110, and/or 112 using one or more audio watermark(s) embedded by the example watermark embedder(s) 114, 116, and/or 118.

Turning to FIG. 3, the illustrated example channel characteristic inspector 208 includes watermark managers 302, 304, and 306, a watermark timestamp extractor 308, a channel mapping inspector 310, a channel timing inspector 312, and subchannel watermark content 314, 316, and 318.

The example watermark managers 302, 304, and 306 of the illustrated example of FIG. 3 can at least one of analyze and store watermarks, in some such examples audio subchannel watermarks 218, 220, and 222, over the known sampling period. In some such examples, in response to the audio channel identifier 120 being unavailable, the example watermark managers 302, 304 and/or 306 can analyze and store a count of audio subchannel watermarks 218, 220, and/or 222 detected by the example watermark detector 206 over the known sampling period.

Additionally or alternatively, in response to the availability of audio channel identifier 120, the example watermark manager(s) 302, 304, and/or 306 can analyze and distribute payload information related to the audio channel identifier 120 decoded by the watermark detector 206 for the audio subchannel watermark(s) 218, 220, and/or 222 for the multichannel audio source 110.

Further, the example watermark manager(s) 302, 304, and/or 306 can distributed at least one of the count of audio subchannel watermark(s) 218, 220, and/or 222 and the payload information of audio subchannel watermark(s) 218, 220, and/or 222 to at least one of the watermark timestamp extractor 308 and channel mapping inspector 310 in the form of subchannel watermark content 314, 316, and/or 318.

The example watermark timestamp extractor 308 of the illustrated example of FIG. 3 is a device that can extract timestamps from payload information of one or more watermark(s), in some such examples audio subchannel watermark(s) 218, 220, and/or 222, as distributed by the example watermark manager(s) 302, 304 and/or 306 in the form of subchannel watermark content 314, 316, and/or 318 in response to a channel timing request from the channel characteristic requester 202.

The example channel mapping inspector 310 of the illustrated example of FIG. 3 is a device that can, in response to a channel mapping request from the channel characteristic requester 202, inspect a channel mapping of one or more audio subchannel(s) 212, 214, and/or 216 of one or more multichannel audio source(s) 108, 110, and/or 112 including watermarks embedded by watermark embedder(s) 114, 116, and/or 118 as presented at the media device 122. The channel mapping is further based upon one or more audio subchannel watermark(s) 218, 220, and/or 222 collected over the known sampling period. In some such examples, in response to the audio channel identifier 120 being unavailable on one or more audio subchannel(s) 212, 214, and/or 216 of a multichannel audio signal, the example channel mapping inspector 310 inspects a channel mapping based on a count of one or more audio subchannel watermark(s) 218, 220, and/or 222 detected by the watermark detector 206 and further analyzed and distributed by one or more watermark manager(s) 302, 304, and/or 306 in the form of subchannel watermark content 314, 316, and/or 318 over the known sampling period.

Alternatively, in response to the audio channel identifier 120 being available on each audio subchannel 212, 214, and 216 of a multichannel audio signal, the example channel mapping inspector 310 inspects a channel mapping based on the audio channel identifier 120 decoded by the watermark detector 206, and further analyzed and distributed by each watermark manager 302, 304, and 306 in the form of subchannel watermark content 314, 316, and/or 318.

The example channel timing inspector 312 of the illustrated example of FIG. 3 is a device that can, in response to a channel timing request from the channel characteristic requester 202, inspect a channel timing of one or more audio subchannel(s) 212, 214, and/or 216 of one or more multichannel audio source(s) 108, 110, and/or 112 including watermarks embedded by watermark embedder(s) 114, 116, and/or 118 as presented at the media device 122. The channel timing is further based upon one or more watermark timestamp(s) of audio subchannel watermark(s) 218, 220, and/or 222, distributed as subchannel watermark content 314, 316, and/or 318, as extracted by the example watermark timestamp extractor 308. Further, the channel timing inspector 312 inspects a channel timing of a multichannel audio signal by inspecting for a time discrepancy for any one or more watermark timestamp(s) on two or more audio subchannels 212, 214, and/or 216 that are meant to be synchronized in time.

The example subchannel watermark content(s) 314, 316, and/or 318 is(are) content related to the example audio subchannel watermark(s) 218, 220, and/or 222. In some such examples, the example subchannel watermark content(s) 314, 316, and/or 318 can include payload information of the audio subchannel watermark(s) 218, 220, and/or 222. In such examples, the example subchannel watermark content(s) 314, 316, and/or 318 can further include the audio channel identifier 120 for one or more of the audio subchannel watermark(s) 218, 220, and/or 222. Additionally or alternatively, the subchannel watermark content(s) 314, 316, and/or 318 can include a count of audio subchannel watermark(s) 218, 220, and/or 222 detected on audio subchannel(s) 212, 214, and/or 216 over a known sampling period.

In operation, the channel characteristic inspector 208 inspects at least one of a channel mapping of a multichannel audio signal and a channel timing of a multichannel audio signal by receiving one or more audio subchannel watermark(s) 218, 220, and/or 222 at one or more watermark manager(s) 302, 304, and/or 306. The one or more watermark manager(s) 302, 304, and/or 306 can at least one of analyze and store the audio subchannel watermark(s) 218, 220, and/or 222 that is(are) at least one of detected and decoded over the known sampling period. The example watermark manager(s) 302, 304, and/or 306 can further distribute information of audio subchannel watermark(s) 218, 220, and/or 222, in the form of subchannel watermark content 314, 316, and/or 318, in response to at least one of a channel mapping and channel timing request from a channel characteristic requester 202, to at least one of the watermark timestamp extractor 308, the channel mapping inspector 310 and the channel timing inspector 312. The channel mapping inspector 310, in response to a channel mapping request from the channel characteristic requester 202, inspects a channel mapping of a multichannel audio signal using subchannel watermark content 314, 316, and/or 318 which contain(s) at least one of stored and analyzed audio subchannel watermark(s) 218, 220, and/or 222, which are at least one of detected and decoded by the watermark detector 206, and further distributed by one or more watermark manager(s) 302, 304, and/or 306. The watermark timestamp extractor 308, in response to a channel timing request from the channel characteristic requester 202, extracts one or more timestamps from one or more audio subchannel watermark(s) 218, 220, and/or 222, further distributed as subchannel watermark content 314, 316, and/or 318 by the watermark manager(s) 302, 304, and/or 306. Further, the watermark timestamp extractor 308 distributes one or more extracted timestamp(s) to the channel timing inspector 312. The channel timing inspector 312 inspects the channel timing of one or more audio subchannel(s) 212, 214, and/or 216 of a multichannel audio signal. Channel mapping results from the channel mapping inspector 310 and channel timing results from the channel timing inspector 312 are combined and distributed to at least one of the result alerter 210 and the central facility 128.

Although the example channel characteristic inspector 208 of FIG. 3 includes three watermark managers 302, 304, and 306, one watermark timestamp extractor 308, one channel mapping inspector 310, one channel timing inspector 312, and three subchannel watermark contents 314, 316, and 318, the channel characteristic inspector 208 as disclosed herein can be used with any number(s) of watermark managers 302, 304, and/or 306, watermark timestamp extractors 308, channel mapping inspectors 310, channel timing inspectors 312, and subchannel watermark content 314, 316, and/or 318.

FIG. 4 illustrates an example report 400 generated by the example channel characteristic inspector 208 in response to the channel characteristic inspector 208 inspecting one or more characteristic(s) of a multichannel audio signal based on one or more audio subchannel watermark(s) 218, 220, and/or 222. The example report 400 of FIG. 4, in some examples being output as a data table, includes the media provider identifier 402 determined from the example system 100, a channel mapping result 404 determined by the channel mapping inspector 310, and a channel timing result 406 determined by the channel timing inspector 312. Thus, the example report 400 indicates (1) which one or more media provider(s) is currently under inspection, (2) a result of a channel mapping inspection via the channel mapping inspector 310, and (3) a result of the a channel timing inspection via the channel timing inspector 312. In the illustrated example report 400, the example data table row 408 includes the media provider identifier 402, in this example CBS 2 WBBM, the channel mapping result 404, in this example "audio is okay" (i.e., no channel mapping issue), and the channel timing result 406, in this example "audio is okay" (i.e., no channel timing issue).

Additionally or alternatively, the example data table row 410 includes the media provider identifier 402, in this example NBC 5 WMAQ, the channel mapping result 404, in this example "channel mapping issue" (i.e., an issue with an undetermined channel of the multichannel audio source 108, 110, and/or 112), and the channel timing result 406, in this example "audio is okay".

Additionally or alternatively, the example data table row 412 includes the media provider identifier 402, in this example ABC 7 WLS, the channel mapping result 404, in this example "audio is okay", and the channel timing result 406, in this example "channel 2 delay" (i.e., the second audio subchannel 214 of a multichannel audio source 108, 110, or 112 is delayed compared to one or more of the remaining audio subchannel(s) 212 and/or 216 of the multichannel audio source 108, 110, or 112).

Additionally or alternatively, the example data table row 414 includes the media provider identifier 402, in this example FOX 32 WFLD, the channel mapping result 404, in this example "audio is okay" and the channel timing result 406, in this example "channel N delay" (i.e., an Nth audio subchannel 216 of the multichannel audio source 108, 110, or 112 is delayed compared to one or more of the remaining audio subchannel(s) 212 and/or 214 of the multichannel audio source 108, 110, or 112).

Additionally or alternatively, the example data table row 416 includes the media provider identifier 402, in this example MY 50 WPWR, the channel mapping result 404, in this example "left channel mapping issue" (i.e., an issue with a left audio channel of the multichannel audio source 110, determined based on one or more watermark(s) including the audio channel identifier 120), and the channel timing result 406, in this example "audio is ok".

Additionally or alternatively, the example data table row 418 includes the media provider identifier 402, in this example WGN 9, the channel mapping result 404, in this example "audio is okay", and the channel timing result 406, in this example "not inspected" (i.e., the channel timing result 406 was not requested by the channel characteristic requester 202).

Additionally or alternatively, the example data table row 420 includes the media provider identifier 402, in this example PBS 11 WTTW, the channel mapping result 404, in this example "not inspected" (i.e., the channel mapping result 404 was not requested by the channel characteristic requester 202), and the channel timing result 406, in this example "audio is ok".

Note that the example report 400 described above is not meant to be limiting, and that the example report 400 could additionally or alternatively be output as a word processed document (generated by Microsoft Word, Google Docs, Apple Pages, Notepad, etc.), a comma delineated file (generated by Microsoft Excel, Google Sheets, Apple Numbers, etc.), an automatically generated electronic mail (E-mail) message, and/or any number of readable output mediums.

Further, note that the proposed combination of data table rows 408, 410, 412, 414, 416, 418, and/or 420 in the example report 400 described above is not meant to be limiting, and that any combination and/or permutation of the data table rows 408, 410, 412, 414, 416, 418, and/or 420 within an example report 400 are covered within the scope of this patent.

Furthermore, the data outputs for media provider identifier 402, channel mapping result 404, and channel timing result 406 proposed in example data table rows 408, 410, 412, 414, 416, 418, and/or 420 described above are not meant to be limiting, and that any combination and/or permutation of the foregoing data outputs for media provider identifier 402, channel mapping result 404, and channel timing result 406 are covered within the scope of this patent.

While an example manner of implementing the example system 100 of FIG. 1 is illustrated in FIGS. 5-8, one or more of the elements, processes and/or devices illustrated in FIGS. 1-3 may be combined, divided, re-arranged, omitted, eliminated and/or implemented in any other way. Further, the example, media providers 102, 104, and/or 106, the example multichannel audio sources 108, 110, and/or 112, the example watermark embedders 114, 116, and/or 118, the example audio channel identifier 120, the example media device 122, the example media monitor 124, the example network 126, the example central facility 128 which can, in some examples, contain the example data store 130, and example processor 132, the example channel characteristic requester 202, the example audio demultiplexer 204, the example watermark detector 206, the example channel characteristic inspector 208, the example result alerter 210, the example audio subchannels 212, 214, and/or 216, the example watermark managers 302, 304, and/or 306, the example watermark timestamp extractor 308, the example channel mapping inspector 310, the example channel timing inspector 312, the subchannel watermark content 314, 316, and/or 318, and/or, more generally, the example system 100 of FIG. 1 may be implemented by hardware, software, firmware and/or any combination of hardware, software and/or firmware. Thus, for example, any of the example media providers 102, 104, and/or 106, the example multichannel audio sources 108, 110, and/or 112, the example watermark embedders 114, 116, and/or 118, the example audio channel identifier 120, the example media device 122, the example media monitor 124, the example network 126, the example central facility 128 which can, in some examples, contain the example data store 130, and example processor 132, the example channel characteristic requester 202, the example audio demultiplexer 204, the example watermark detector 206, the example channel characteristic inspector 208, the example result alerter 210, the example audio subchannels 212, 214, and/or 216, the example watermark managers 302, 304, and/or 306, the example watermark timestamp extractor 308, the example channel mapping inspector 310, the example channel timing inspector 312, the subchannel watermark content 314, 316, and/or 318 and/or, more generally, the example system 100 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, media providers 102, 104, and/or 106, the example multichannel audio sources 108, 110, and/or 112, the example watermark embedders 114, 116, and/or 118, the example audio channel identifier 120, the example media device 122, the example media monitor 124, the example network 126, the example central facility 128 which can, in some examples, contain the example data store 130, and example processor 132, the example channel characteristic requester 202, the example audio demultiplexer 204, the example watermark detector 206, the example channel characteristic inspector 208, the example result alerter 210, the example audio subchannels 212, 214, and/or 216, the example watermark managers 302, 304, and/or 306, the example watermark timestamp extractor 308, the example channel mapping inspector 310, the example channel timing inspector 312, and the subchannel watermark content 314, 316, and/or 318 is/are hereby expressly defined to include a non-transitory computer readable storage device or storage disk such as a memory, a digital versatile disk (DVD), a compact disk (CD), a Blu-ray disk, etc. including the software and/or firmware. Further still, the example system 100 of FIG. 1 may include one or more elements, processes and/or devices in addition to, or instead of, those illustrated in FIG. 1, and/or may include more than one of any or all of the illustrated elements, processes and devices.

Figure 5:
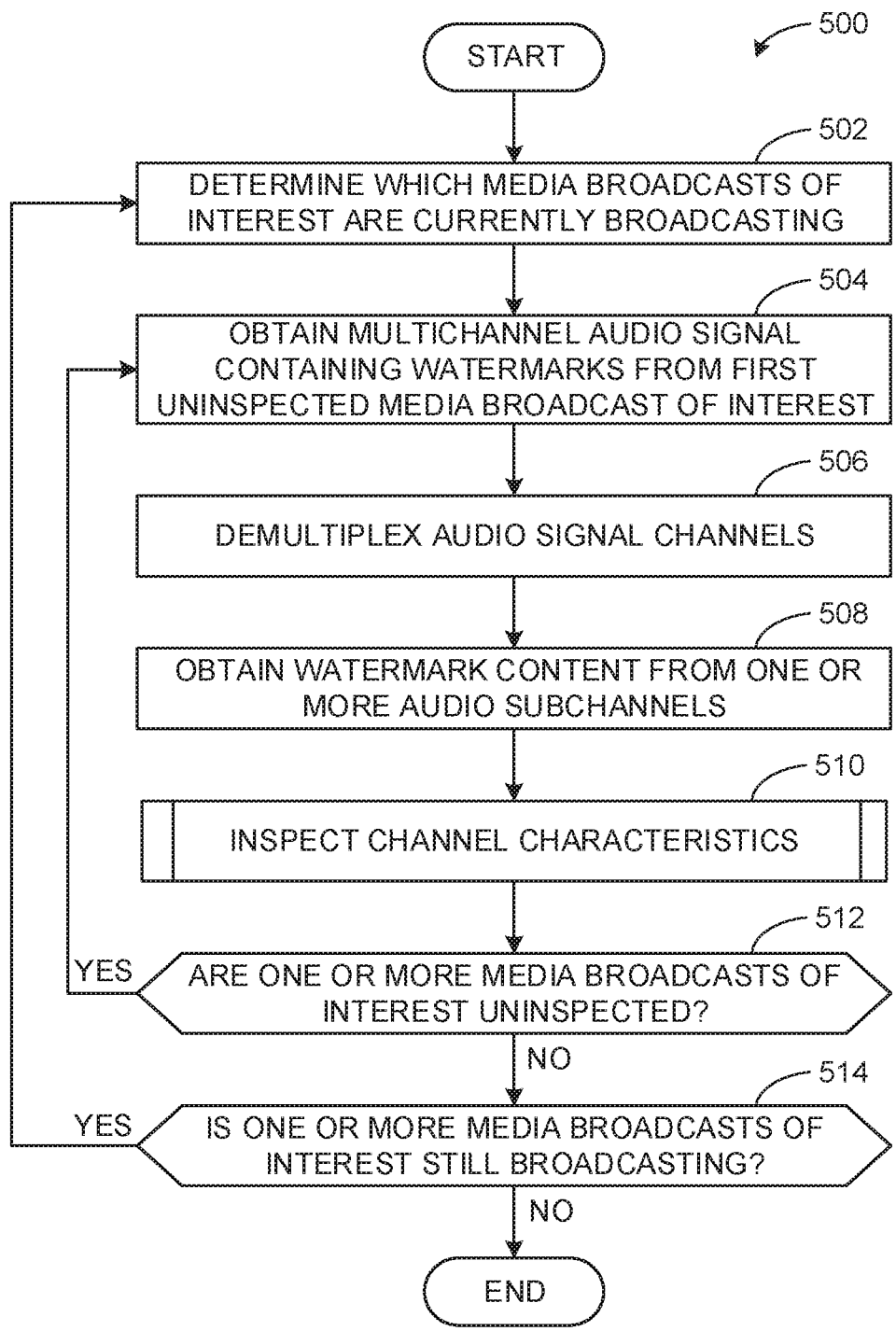
FIG. 5 is a flowchart representative of example machine-readable instructions that may be executed to implement the example media monitor of FIGS. 1 & 2.

A flowchart representative of example machine readable instructions for implementing the example system 100 of FIG. 1 is shown in FIG. 5. In this example, the machine readable instructions comprise a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-8, many other methods of implementing the example system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, a Field Programmable Gate Array (FPGA), an Application Specific Integrated circuit (ASIC), a comparator, an operational-amplifier (op-amp), a logic circuit, etc.) structured to perform the corresponding operation without executing software or firmware.

As mentioned above, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. "Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

Example machine readable instructions 500 that may be executed to perform channel characteristic inspection for audio watermarking in multichannel audio signals in the example media monitor 124 of FIG. 1 are illustrated in FIG. 5. With reference to the preceding figures and associated descriptions, the example machine readable instructions 500 of FIG. 5 begin execution at block 502 at which the channel characteristic requester 202 determines which one or more media broadcast(s) of interest, in some such examples distributed by the one or more media provider(s) 102, 104, and/or 106, is(are) currently broadcasting.

At block 504, the example audio demultiplexer 204 obtains the first uninspected multichannel audio source of example multichannel audio source(s) 108, 110, and/or 112 containing watermarks embedded by the example watermark embedder(s) 114, 116, and/or 118 from the example media device 122 for inspection, as described above.

At block 506, the audio demultiplexer 204 demultiplexes the first uninspected multichannel audio source of one or more example multichannel audio source(s) 108, 110, and/or 112, thereby obtaining one or more audio subchannel(s) 212, 214, and/or 216 from the first uninspected multichannel audio source of the one or more example multichannel audio source(s) 108, 110, and/or 112.

At block 508, one or more audio subchannel watermark(s) 218, 220, and/or 222 embedded in one or more audio subchannel(s) 212, 214, and/or 216 are detected by the watermark detector 206. Further, in some examples, the watermark detector 206 can decode the one or more audio subchannel watermark(s) 218, 220, and/or 222 detected in one or more audio subchannel(s) 212, 214, and/or 216.

At block 510, further detailed below, channel characteristics of the first uninspected multichannel audio source of one or more example multichannel audio source(s) 108, 110, and/or 112 containing watermarks embedded by the example watermark embedder(s) 114, 116, and/or 118 presented by the example media device 122 are inspected using the one or more audio subchannel watermark(s) 218, 220, and/or 222.

At block 512, the channel characteristic requester 202 determines if one or more media broadcast(s) of interest remain uninspected. In response to one or more media broadcast(s) remaining uninspected, processing transfers to block 504. Conversely, if all media broadcasts of interest are inspected, processing transfers to block 514.

At block 514, the channel characteristic requester 202 is further to determine if the media monitor 124 is receiving one or more broadcasts(s) of interest from the media device 122. In response to the channel characteristic requester 202 determining the media monitor 124 is receiving a media broadcast of interest from the media device 122, processing returns to block 502. Conversely, if the media monitor 124 is determined to not be receiving any media broadcasts of interest from the media device 122, block 514 sets the example machine readable instructions 500 of FIG. 5 to end.

Accordingly, execution of the example machine readable instructions 500 illustrated in FIG. 5 cause the media monitor 124 to determine which media broadcasts of interest are currently broadcasting, and further obtain, isolate, and detect one or more watermark(s) embedded in one or more audio subchannel(s) of the first uninspected media broadcast of interest, and inspect one or more channel characteristic(s) of the embedded watermarks for the duration of one or more media broadcast(s) of interest.

Figure 6:
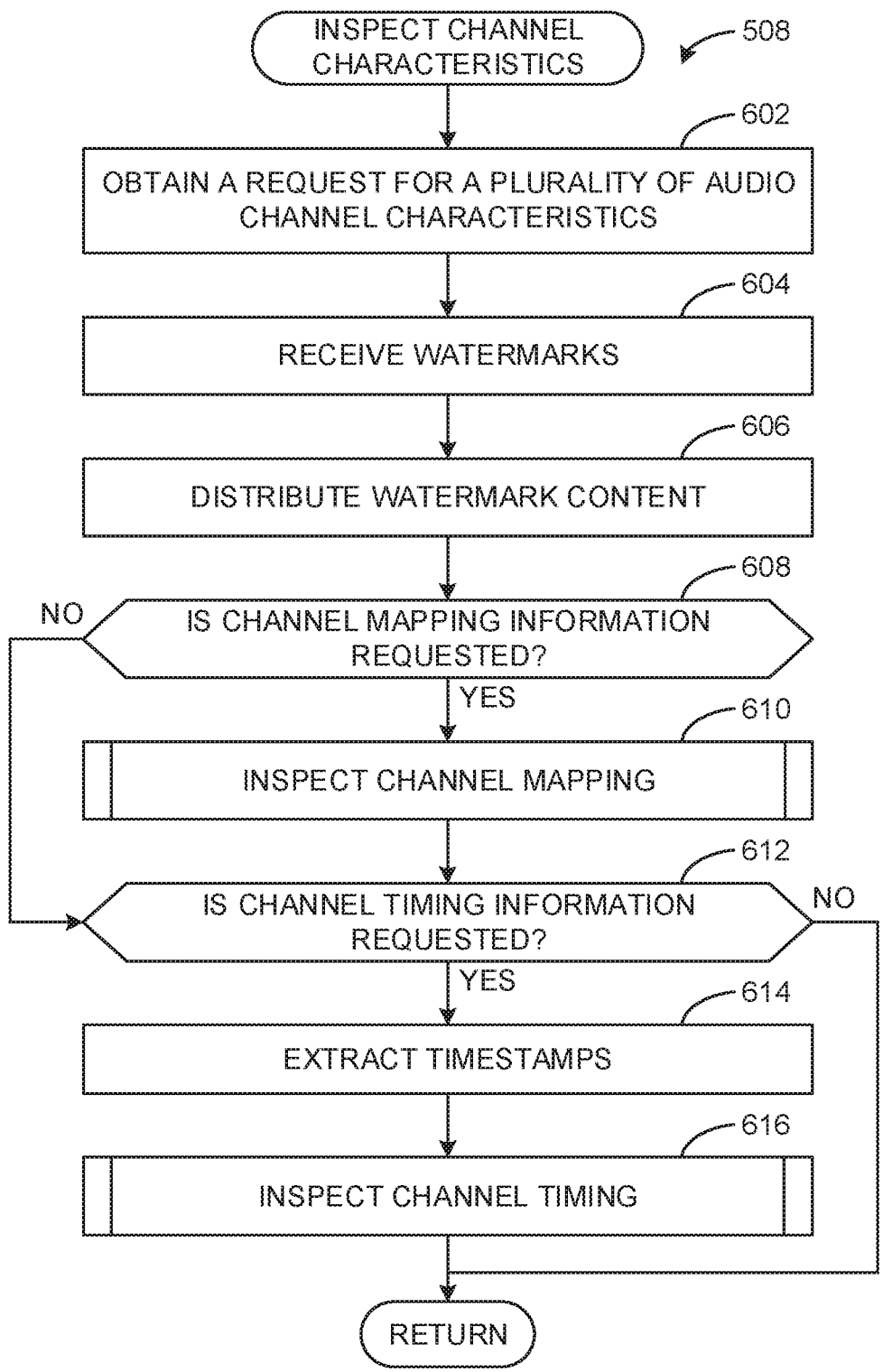
FIG. 6 is a flowchart representative of example machine-readable instructions that may be executed to implement the example channel characteristic inspector of FIGS. 2 & 3.

Example machine readable instructions that may be executed to inspect channel characteristics (FIG. 5, block 508) of multichannel audio signals utilizing the example channel characteristic inspector 208 of FIG. 3 are illustrated in FIG. 6. With reference to the preceding figures and associated descriptions, the example method of FIG. 6 begin execution at block 602 at which at least one of a watermark timestamp extractor 308, channel mapping inspector 310, and channel timing inspector 312 receive at least one of a channel mapping inspection request and a channel timing inspection request from the channel characteristic requester 202, as described above.

At block 604, the example watermark manager(s) 302, 304, and/or 306 receive(s) one or more audio subchannel watermark(s) 218, 220, and/or 222 from the example watermark detector 206.

Further, at block 606, the example watermark manager(s) 302, 304, and/or 306 distribute(s) one or more subchannel watermark content(s) 314, 316, and/or 318. In some such examples, watermark payload information has not been decoded and the example watermark manager(s) 302, 304, and/or 306 distributes(s) a count of watermarks detected by the watermark detector 206 on one or more audio subchannels 212, 214, and/or 216 of a multichannel audio signal in the form of subchannel watermark content(s) 314, 316, and/or 318. In other such examples, watermark payload information has been decoded and the example watermark manager(s) 302, 304, and/or 306 distribute(s) one or more elements of payload information decoded by the watermark detector 206 on one or more audio subchannels 212, 214, and/or 216 of a multichannel audio signal in the form of subchannel watermark content(s) 314, 316, and/or 318.

At block 608, the channel characteristic inspector 208 determines whether channel mapping information is requested by the channel characteristic requester 202. In response to identifying channel mapping information as requested, processing transfers to block 610. Alternatively, in response to identifying channel mapping information as not requested, processing transfers to block 612.

At block 610, further detailed below, the channel mapping of one or more example multichannel audio source(s) 108, 110, and/or 112 containing watermarks embedded by the example watermark embedder(s) 114, 116, and/or 118 and distributed by the example media provider(s) 102, 104, and/or 106 presented by example media device 122 are inspected utilizing the one or more subchannel watermark content(s) 314, 316, and/or 318.

At block 612, the channel characteristic inspector 208 determines whether channel timing information is requested by the channel characteristic requester 202. In response to identifying channel timing information as requested, processing transfers to block 614. Alternatively, in response to identifying channel timing information as not requested, the example method of FIG. 6 is completed and processing returns to block 510 of the example machine readable instructions 500 of FIG. 5.

At block 614, in response to block 612 identifying channel timing information as requested, one or more watermark timestamp(s) are extracted from one or more subchannel watermark content(s) 314, 316, and/or 318 by the example watermark timestamp extractor 308.

At block 616, further detailed below, the channel timing of one or more example multichannel audio source(s) 108, 110, and/or 112 containing watermarks embedded by the example watermark embedder(s) 114, 116, and/or 118 and presented by example media device 122 are inspected using the one or more subchannel watermark content(s) 314, 316, and/or 318.

Accordingly, execution of the example method illustrated in FIG. 6 cause the channel characteristic inspector 208 to obtain a request for one or more channel characteristic inspection(s), receive and store audio watermark content, determine if channel mapping information is requested, inspect channel mapping in response to channel mapping information being requested, determine if channel timing information is requested, and extract one or more timestamp(s) from one or more embedded watermark(s) and further inspect channel timing in response to channel timing information being requested. After completion of at least one of block 612 and block 616, the example method of FIG. 6 returns processing to block 512 of the example machine readable instructions 500 of FIG. 5.

Figure 7A:
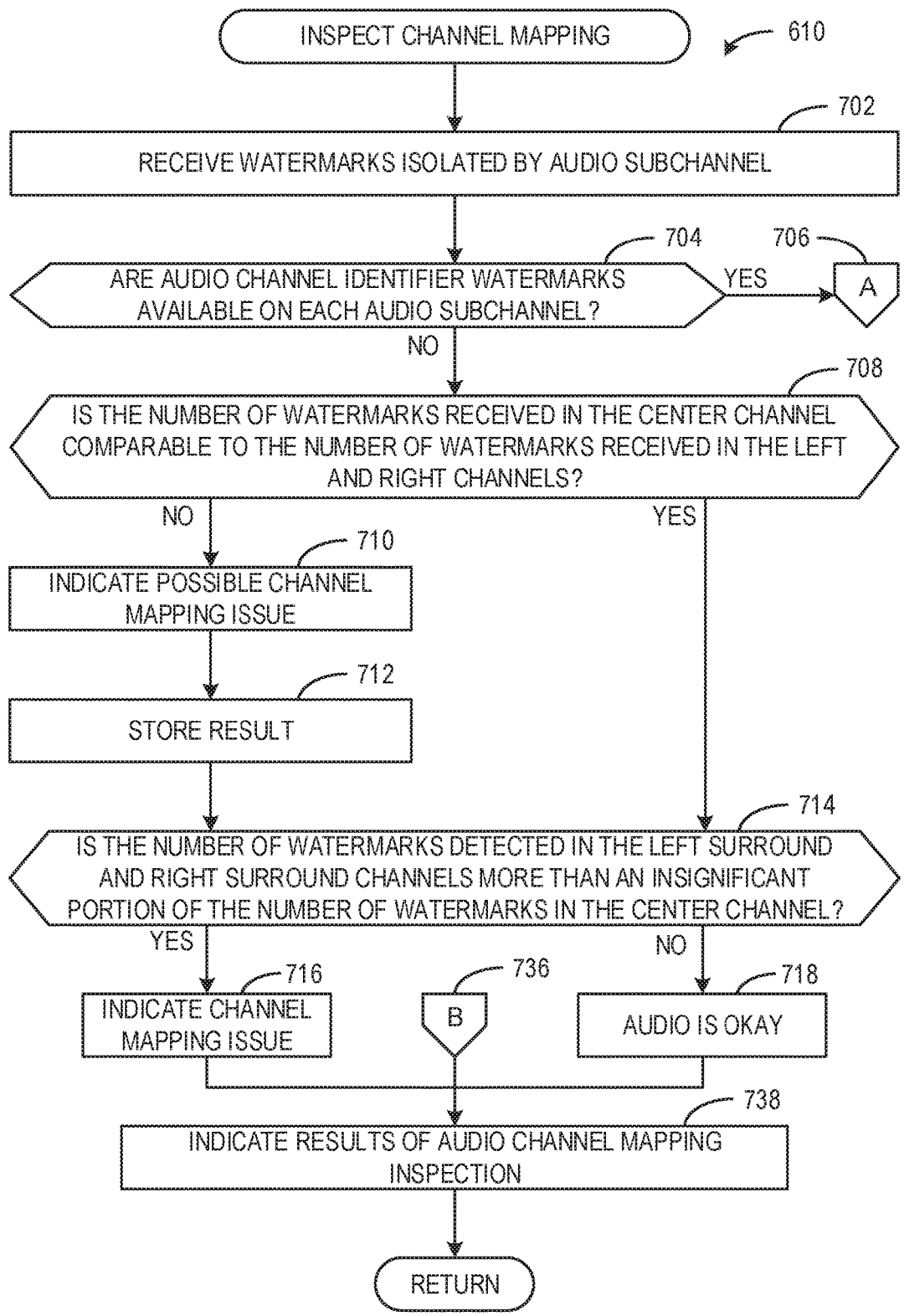
FIG. 7A-7B collectively form a flowchart representative of example machine-readable instructions that may be executed to implement the example channel mapping inspector of FIG. 3.
Figure 7B:
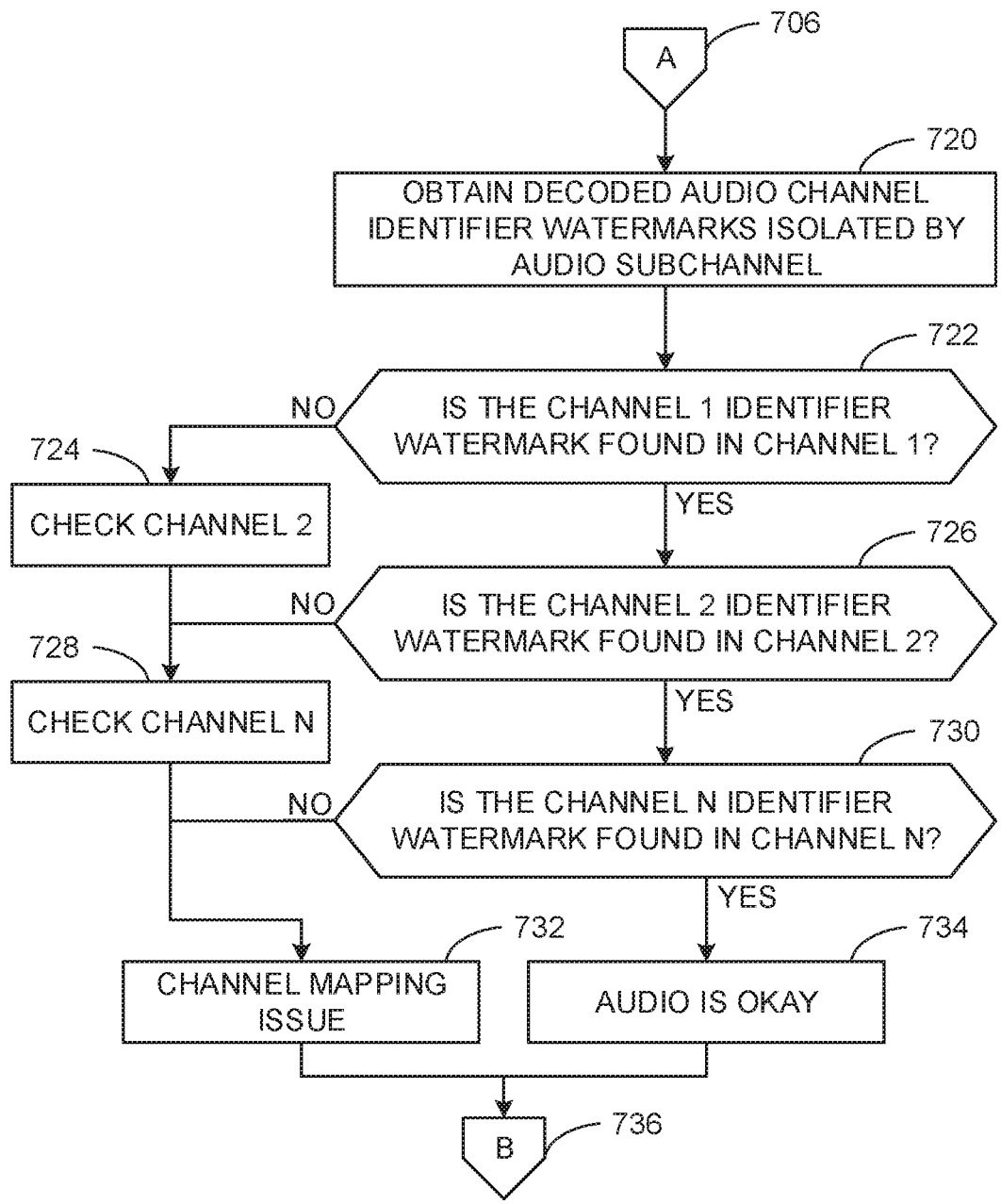

Example machine readable instructions that may be executed to perform channel mapping inspection (FIG. 6, block 610) for audio watermarking in multichannel audio signals in the example channel mapping inspector 310 of FIG. 3 are illustrated in FIG. 7A-7B. With reference to the preceding figures and associated descriptions, the example method of FIG. 7 begin execution at block 702 at which the example channel mapping inspector 310 receives one or more subchannel watermark content(s) 314, 316, and/or 318 from one or more watermark manager(s) 302, 304, and/or 306, as described above.

At block 704, the channel mapping inspector 310 determines whether audio channel identifier 120 is embedded in each audio subchannel of a multichannel audio signal. In response to identifying the audio channel identifier 120 is embedded on each audio subchannel of a multichannel audio signal, processing transfers to block 724. Alternatively, in response to identifying the audio channel identifier 120 is not embedded on each audio subchannel of a multichannel audio signal, processing transfers to block 708.

At block 708, in response to identifying the audio channel identifier 120 is not embedded on each audio channel of multichannel audio signal, the channel mapping inspector 310 determines the channel mapping of one or more example multichannel audio source(s) 108, 110, and/or 112 containing watermarks embedded by the example watermark embedder(s) 114, 116, and/or 118 and presented at the example media device 122 utilizing the count of one or more audio subchannel watermark(s) 218, 220, and/or 222 as distributed by the example watermark manager(s) 302, 304, and/or 306 in the form of subchannel watermark content(s) 314, 316, and/or 318. In some such examples, the channel mapping inspector 310 determining the channel mapping further includes comparing a count of watermarks received in the center channel with a count of watermarks received in each of the left channel and right channel of a multichannel audio signal. In response to identifying that the count of watermarks received in the center channel is similar to the count of watermarks received in each of the left channel and right channel of a multichannel audio signal, processing transfers to block 714. Alternatively, in response to identifying that the count of watermarks received in the center channel is not similar to the count of watermarks received in each of the left channel and right channel of a multichannel audio signal, processing transfers to block 710.

At block 710, the channel mapping inspector 310 sets a flag indicating that a possible channel mapping issue exists. Further, block 712 stores the flag set by block 710 in the channel mapping inspector 310.

At block 714, the channel mapping inspector 310 compares a count of watermarks detected in the center channel of a multichannel audio signal with a count of watermarks detected in each of a left surround and right surround channel of a multichannel audio signal. In response to identifying that the count of watermarks in at least one of the left surround channel and right surround channel is insignificant when compared to the count of watermarks detected in the center channel of a multichannel audio signal, processing transfers to block 718 where the channel mapping inspector 310 sets a flag indicating that the audio is okay. Alternatively, in response to identifying that the count of watermarks in at least one of the left surround channel and right surround channel is significant when compared to the count of watermarks detected in the center channel of a multichannel audio signal, processing transfers to block 716 where the channel mapping inspector 310 sets a flag indicating that a channel mapping issue exists.

At block 720, in response to identifying the audio channel identifier 120 is embedded on each audio channel of a multichannel audio signal, the channel mapping inspector 310 is to obtain the audio channel identifier 120 for one or more watermark(s) as distributed by subchannel watermark content(s) 314, 316, and/or 318.

At block 722, in response to obtaining the audio channel identifier 120 from the subchannel watermark content(s) 314, 316, and/or 318, the channel mapping inspector 310 determines whether the channel 1 identifier watermark of the audio channel identifier 120 is properly embedded in channel 1. In response to identifying the channel 1 watermark is embedded in channel 1, processing transfers to block 726. Alternatively, in response to identifying the channel 1 watermark is not embedded in channel 1 (e.g., the channel 1 watermark is not embedded in any channel of a multichannel audio signal, the channel 1 watermark is embedded in channel 2 of a multichannel audio signal, etc.), processing transfers to block 724.

At block 724, the channel mapping inspector 310 determines whether the channel 2 identifier watermark of the audio channel identifier 120 is properly embedded in channel 2. Upon completion of inspection, processing transfers to block 728.

At block 726, the channel mapping inspector 310 determines whether the channel 2 identifier watermark of the audio channel identifier 120 is properly embedded in channel 2. In response to identifying the channel 2 watermark is embedded in channel 2, processing transfers to block 730. Alternatively, in response to identifying the channel 2 watermark is not embedded in channel 2 (e.g., the channel 2 watermark is not embedded in any channel of a multichannel audio signal, the channel 2 watermark is embedded in channel N of a multichannel audio signal, etc.), processing transfers to block 728.

At block 728, the channel mapping inspector 310 determines whether the channel N identifier watermark of the audio channel identifier 120 is properly embedded in channel N. Upon completion of inspection, processing transfers to block 732.

At block 730, the channel mapping inspector 310 determines whether the channel N identifier watermark of the audio channel identifier 120 is properly embedded in channel N. In response to identifying the channel N watermark is embedded in channel N, processing transfers to block 730.

Alternatively, in response to identifying the channel N watermark is not embedded in channel N (e.g., the channel N watermark is not embedded in any channel of a multichannel audio signal, the channel N watermark is embedded in channel 1 of a multichannel audio signal, etc.), processing transfers to block 732.

At block 732, the channel mapping inspector 310 sets a flag indicating a channel mapping issue exists in response to at least one of the channel 1, channel 2, and channel N identifier watermark(s) not being embedded in the channel respective to the watermark. Further, in some such examples, the channel mapping inspector 310 stores the individual results of the determination(s) of at least one of block(s) 722, 724, 726, 728, and 730 and can, in such examples, further indicate which one or more subchannel(s) of a multichannel audio signal are mapped improperly. Upon completion of setting the channel mapping issue flag, processing transfers to block 738.

At block 734, the channel mapping inspector 310, in response to each of channel 1, channel 2, and channel N of the multichannel audio signal containing a proper audio channel identifier watermark, sets a flag indicating the audio channel mapping is okay and processing transfers to block 738.

At block 738, the channel mapping inspector 310 sets a flag indicating the compiled results of the channel mapping inspection. In some such examples, the compiled results can read "Audio is okay". Alternatively, the compiled results can read "Channel mapping issue". Alternatively, the compiled results can read "Possible channel mapping issue; audio is okay". Alternatively, the compiled results can read "Channel mapping issue; channel 2". Additionally or alternatively, note that the above examples are not meant to be limiting, and that any combination and/or permutation of the foregoing audio channel mapping inspection flags are covered in the scope of this patent.

Accordingly, execution of the example machine readable instructions illustrated in FIG. 7 cause the example channel mapping inspector 310 to receive one or more audio watermark(s) isolated by audio subchannel, determine if audio channel identifier watermarks are available, inspect the channel mapping using audio channel identifier watermarks in response to the availability of audio channel identifier watermarks, inspect the channel mapping using a count of audio watermarks in response to the unavailability of audio channel identifier watermarks, and compile the results of the channel mapping inspection. After completion of block 738, the example machine readable instructions of FIG. 7A-7B returns processing to block 612 of the example method of FIG. 6.

Figure 8:
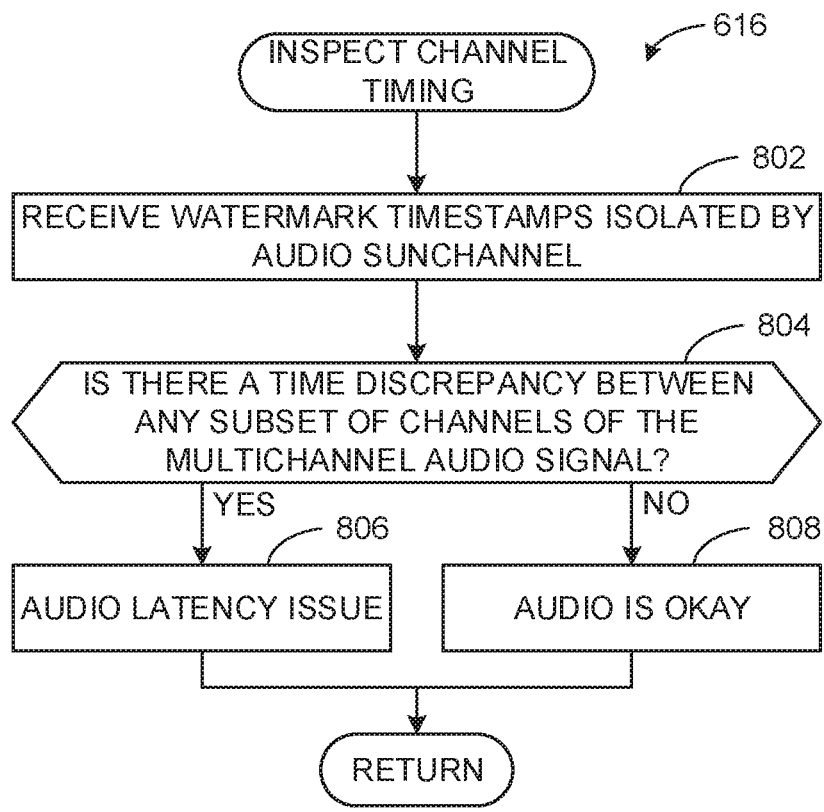
FIG. 8 is a flowchart representative of example machine-readable instructions that may be executed to implement the example channel timing inspector of FIG. 3.

Example machine readable instructions that may be executed to inspect channel timing (FIG. 6, block 616) for audio watermarking in multichannel audio signals in the example channel timing inspector 312 of FIG. 3 are illustrated in FIG. 8. With reference to the preceding figures and associated descriptions, the example method of FIG. 8 begins execution at block 802 at which the example channel timing inspector 312 receives one or more watermark timestamp(s), isolated by audio subchannel, from the example watermark timestamp extractor 308, as described above.

At block 804, the channel timing inspector 312 inspects one or more watermark timestamp(s) output by the watermark timestamp extractor 308. Further, the channel timing inspector 312 inspects for a time discrepancy (i.e., two subchannels not substantially synchronized in time) between one or more watermark timestamp(s) embedded on a pair of audio subchannels intended to be synchronized in time. This process is repeated for a subset of pairs of audio subchannels In response to block 804 determining that a time discrepancy exists for one or more watermark timestamp(s) isolated by subchannel on a pair of audio subchannels intended to be embedded substantially synchronized in time for any one or more pair(s) of audio subchannels, indicating at block 806, with the channel timing inspector 312, that an audio channel timing issue exists.

In response to block 804 determining that a time discrepancy does not exist for one or more watermark timestamp(s) isolated by subchannel on a pair of audio subchannels intended to be embedded synchronized in time for each of a subset of pairs of audio subchannels, indicating at block 808, with the channel timing inspector 312, that the audio is okay.

Accordingly, execution of the example method illustrated in FIG. 8 cause the example channel timing inspector 312 to receive watermark timestamps isolated by audio subchannel, inspect for a time discrepancy between any one or more pair(s) of audio subchannels of a multichannel audio signal, and determine and further indicate if a channel timing issue exists. Upon completion of at least one of block 806 and block 808, the example method of FIG. 8 returns the processing to the end of the example method of FIG. 6, further returning the processing to block 510 of the example machine readable instructions 500 of FIG. 5.

Figure 9:
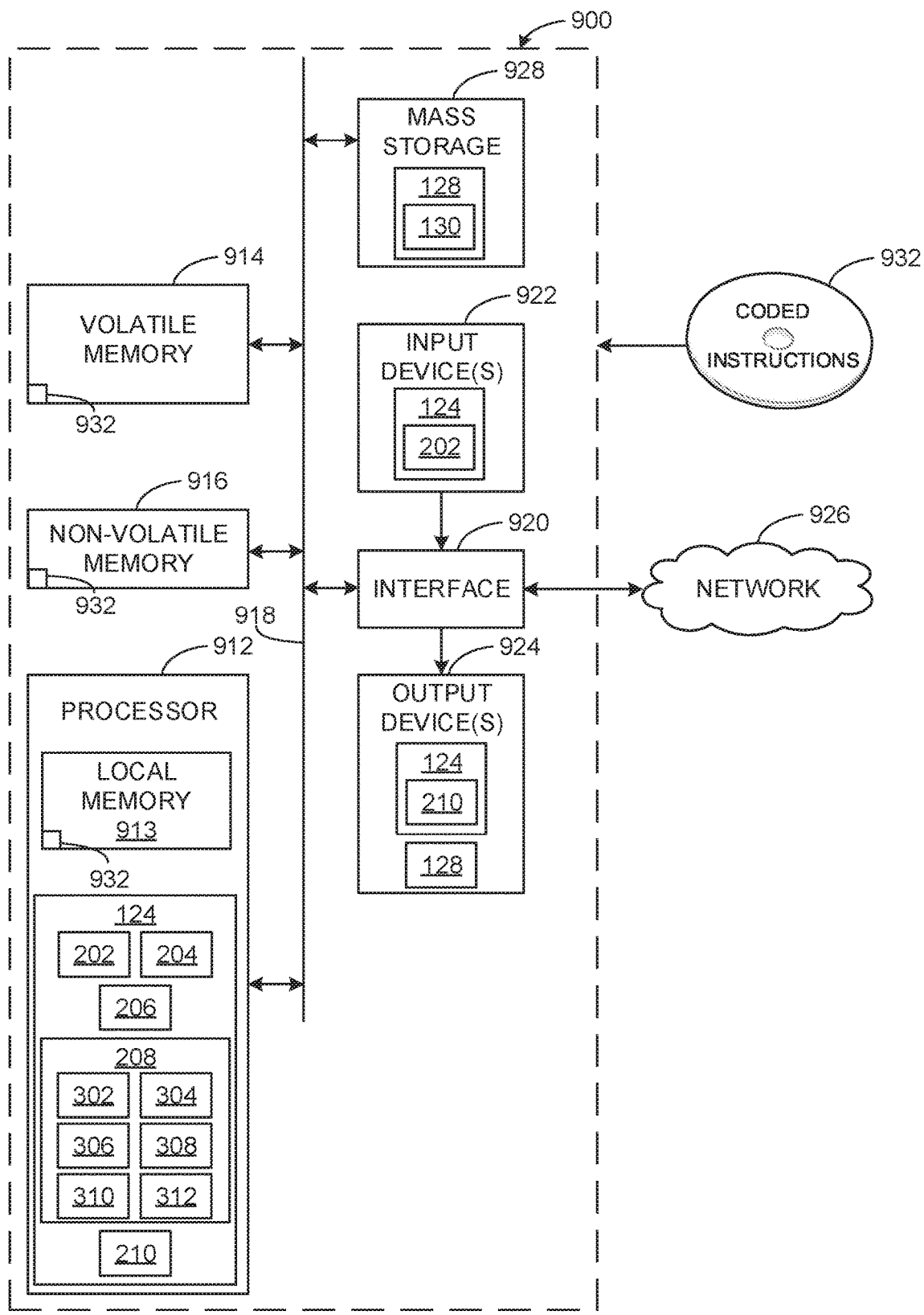
FIG. 9 is a block diagram of an example processor platform capable of executing the instructions of FIGS. 5, 6, 7A, 7B, and/or 8 to implement the example system of FIG. 1.

FIG. 9 is a block diagram of an example processor platform 900 capable of executing the instructions of FIGS. 5-8 to implement the apparatus of FIGS. 1-3. The processor platform 900 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. The hardware processor may be a semiconductor based (e.g., silicon based) device. In this example, the processor implements the media monitor 124 which can, in some such examples, include the channel characteristic requester 202, the audio demultiplexer 204, the watermark detector 206, the channel characteristic inspector 208 which can, in some such examples, include the one or more watermark manager(s) 302, 304, and/or 306, the watermark timestamp extractor 308, the channel mapping inspector 310, and the channel timing inspector 312, and the result alerter 210.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, etc.).

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives.

The coded instructions 932 of FIGS. 5-8 may be stored in the mass storage device 928, in the volatile memory 914, in the non-volatile memory 916, and/or on a removable tangible computer readable storage medium such as a CD or DVD.

From the foregoing, it will be appreciated that example methods, apparatus and articles of manufacture have been disclosed that inspect characteristics of multichannel audio using watermarking techniques.

Although certain example methods, apparatus, and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
    an audio demultiplexer to obtain a first audio subchannel and a second audio subchannel of a multichannel audio signal;
    a watermark detector to detect watermarks in the first audio subchannel and watermarks in the second audio subchannel;
    a channel characteristic inspector to compare a number of watermarks detected in the first audio subchannel and a number of watermarks detected in the second audio subchannel to determine whether the first audio subchannel and the second audio subchannel were watermarked in accordance with a watermark encoder configuration, the watermark encoder configuration to cause at least one of:
        the number of watermarks in the first audio subchannel to be approximately equal to the number of watermarks in the second audio subchannel when the first audio subchannel is a center audio subchannel and the second audio subchannel is at least one of a right audio subchannel or a left audio subchannel;
        the number of watermarks in the first audio subchannel to be approximately equal to the number of watermarks in the second audio subchannel when the first audio subchannel is the left audio subchannel and the second audio subchannel is the right audio subchannel; or
        the number of watermarks in the first audio subchannel to be less than the number of watermarks in the second audio subchannel when the first audio subchannel is associated with at least one of the left surround audio channel, the right surround audio channel, or a low frequency audio channel; and
    a result alerter to distribute an alert in response to a determination that the first audio subchannel and the second audio subchannel were not watermarked in accordance with the watermark encoder configuration.

2. An apparatus comprising:
    an audio demultiplexer to obtain a first audio subchannel and a second audio subchannel of a multichannel audio signal;
    a watermark detector to detect watermarks in the first audio subchannel and watermarks in the second audio subchannel;
    a channel characteristic inspector to compare a number of watermarks detected in the first audio subchannel and a number of watermarks detected in the second audio subchannel to determine whether the first audio subchannel and the second audio subchannel were watermarked in accordance with a watermark encoder configuration;
    a watermark timestamp extractor to:
        determine a first timestamp from a watermark of the first audio subchannel; and
        determine a second timestamp from a watermark of the second audio subchannel;
    a channel timing inspector to compare a first time associated with the first timestamp and a second time associated with the second timestamp to determine whether the first audio subchannel and the second audio subchannel were watermarked in accordance with the watermark encoder configuration; and
    a result alerter to distribute an alert in response to a determination that the first audio subchannel and the second audio subchannel were not watermarked in accordance with the watermark encoder configuration.

3. The apparatus of claim 1, further including a channel timing inspector to determine whether the watermarks detected in the first audio subchannel and the watermarks detected in the second audio subchannel have similar timestamps.

4. An apparatus comprising:
    an audio demultiplexer to obtain a first audio subchannel and a second audio subchannel of a multichannel audio signal;
    a watermark detector to detect watermarks in the first audio subchannel and watermarks in the second audio subchannel;
    a channel characteristic inspector to:
        compare a number of watermarks detected in the first audio subchannel and a number of watermarks detected in the second audio subchannel to determine whether the first audio subchannel and the second audio subchannel were watermarked in accordance with a watermark encoder configuration;
obtain an audio channel identifier from a first watermark detected in the first audio subchannel; and
determine whether the first audio subchannel was watermarked in accordance with the watermark encoder configuration based on whether the audio channel identifier corresponds to the first audio subchannel; and
a result alerter to distribute an alert in response to a determination that the first audio subchannel and the second audio subchannel were not watermarked in accordance with the watermark encoder configuration.

5. A method comprising:
detecting, by executing an instruction with a processor, watermarks in a first audio subchannel of a multichannel audio signal;
detecting, by executing an instruction with the processor, watermarks in a second audio subchannel of the multichannel audio signal;
comparing, by executing an instruction with the processor, a number of watermarks detected in the first audio subchannel and a number of watermarks detected in the second audio subchannel to determine whether the first audio subchannel and the second audio subchannel were watermarked in accordance with a watermark encoder configuration, the watermark encoder configuration to cause at least one of:
the number of watermarks in the first audio subchannel to be approximately equal to the number of watermarks in the second audio subchannel when the first audio subchannel is a center audio subchannel and the second audio subchannel is at least one of a right audio subchannel or a left audio subchannel;
the number of watermarks in the first audio subchannel to be approximately equal to the number of watermarks in the second audio subchannel when the first audio subchannel is the left audio subchannel and the second audio subchannel is the right audio subchannel; or
the number of watermarks in the first audio subchannel to be less than the number of watermarks in the second audio subchannel when the first audio subchannel is associated with at least one of the left surround audio channel, the right surround audio channel, or a low frequency audio channel; and
distributing, by executing an instruction with the processor, an alert in response to a determination that the first audio subchannel and the second audio subchannel were not watermarked in accordance with the watermark encoder configuration.

6. A method comprising:
detecting, by executing an instruction with a processor, watermarks in a first audio subchannel of a multichannel audio signal;
detecting, by executing an instruction with the processor, watermarks in a second audio subchannel of the multichannel audio signal;
comparing, by executing an instruction with the processor, a number of watermarks detected in the first audio subchannel and a number of watermarks detected in the second audio subchannel to determine whether the first audio subchannel and the second audio subchannel were watermarked in accordance with a watermark encoder configuration;

extracting a first timestamp from a watermark of the first audio subchannel;
extracting a second timestamp from a watermark of the second audio subchannel;
comparing a first time associated with the first timestamp and a second time associated with the second timestamp to determine whether the first audio subchannel and the second audio subchannel were watermarked in accordance with the watermark encoder configuration; and
distributing, by executing an instruction with the processor, an alert in response to a determination that the first audio subchannel and the second audio subchannel were not watermarked in accordance with the watermark encoder configuration.

7. A method comprising:
detecting, by executing an instruction with a processor, watermarks in a first audio subchannel of a multichannel audio signal;
detecting, by executing an instruction with the processor, watermarks in a second audio subchannel of the multichannel audio signal;
comparing, by executing an instruction with the processor, a number of watermarks detected in the first audio subchannel and a number of watermarks detected in the second audio subchannel to determine whether the first audio subchannel and the second audio subchannel were watermarked in accordance with a watermark encoder configuration;
obtaining an audio channel identifier from a first watermark detected in the first audio subchannel;
determining whether the first audio subchannel was watermarked in accordance with the watermark encoder configuration based on whether the audio channel identifier corresponds to the first audio subchannel; and
distributing, by executing an instruction with the processor, an alert in response to a determination that the first audio subchannel and the second audio subchannel were not watermarked in accordance with the watermark encoder configuration.

8. A non-transitory machine readable storage medium comprising machine readable instructions which, when executed, cause a processor to at least:
detect watermarks in a first audio subchannel of a multichannel audio signal;
detect watermarks in a second audio subchannel of the multichannel audio signal;
compare a number of watermarks detected in the first audio subchannel and a number of watermarks detected in the second audio subchannel to determine whether the first audio subchannel and the second audio subchannel were watermarked in accordance with a watermark encoder configuration, the watermark encoder configuration to cause at least one of:
the number of watermarks in the first audio subchannel to be approximately equal to the number of watermarks in the second audio subchannel when the first audio subchannel is a center audio subchannel and the second audio subchannel is at least one of a right audio subchannel or a left audio subchannel;
the number of watermarks in the first audio subchannel to be approximately equal to the number of watermarks in the second audio subchannel when the first audio subchannel is the left audio subchannel and the second audio subchannel is the right audio subchannel; or the number of watermarks in the first audio subchannel to be less than the number of watermarks in the second audio subchannel when the first audio subchannel is associated with at least one of the left surround audio channel, the right surround audio channel, or a low frequency audio channel; and distribute an alert in response to a determination that the first audio subchannel and the second audio subchannel were not watermarked in accordance with the watermark encoder configuration.

9. The non-transitory machine readable storage medium of claim 8, wherein the instructions, when executed, further cause the processor to determine whether the watermarks detected in the first audio subchannel and the watermarks detected in the second audio subchannel have similar timestamps.

10. A non-transitory machine readable storage medium comprising machine readable instructions which, when executed, cause a processor to at least:

detect watermarks in a first audio subchannel of a multichannel audio signal;

detect watermarks in a second audio subchannel of the multichannel audio signal;

compare a number of watermarks detected in the first audio subchannel and a number of watermarks detected in the second audio subchannel to determine whether the first audio subchannel and the second audio subchannel were watermarked in accordance with a watermark encoder configuration;

extract a first timestamp from a watermark of the first audio subchannel;

extract a second timestamp from a watermark of the second audio subchannel;

compare a first time associated with the first timestamp and a second time associated with the second timestamp to determine whether the first audio subchannel and the second audio subchannel were watermarked in accordance with the watermark encoder configuration; and distribute an alert in response to a determination that the first audio subchannel and the second audio subchannel were not watermarked in accordance with the watermark encoder configuration.

11. A non-transitory machine readable storage medium comprising machine readable instructions which, when executed, cause a processor to at least:

detect watermarks in a first audio subchannel of a multichannel audio signal;

detect watermarks in a second audio subchannel of the multichannel audio signal;

compare a number of watermarks detected in the first audio subchannel and a number of watermarks detected in the second audio subchannel to determine whether the first audio subchannel and the second audio subchannel were watermarked in accordance with a watermark encoder configuration;

obtain an audio channel identifier from a first watermark detected in the first audio sub channel;

determine whether the first audio subchannel was watermarked in accordance with the watermark encoder configuration based on whether the audio channel identifier corresponds to the first audio subchannel; and distribute an alert in response to a determination that the first audio subchannel and the second audio subchannel were not watermarked in accordance with the watermark encoder configuration.

* * * * *